(12) United States Patent
Palenius et al.

(10) Patent No.: US 10,567,991 B2
(45) Date of Patent: Feb. 18, 2020

(54) MEASURING MULTIPLE CARRIERS UNDER DISCONTINUOUS ACTIVITY

(71) Applicant: Telefonaktiebolaget LM Ericsson (publ), Stockholm (SE)

(72) Inventors: Torgny Palenius, Barsebäck (SE); Muhammad Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/771,930

(22) PCT Filed: Nov. 2, 2016

(86) PCT No.: PCT/SE2016/051075
§ 371 (c)(1),
(2) Date: Apr. 27, 2018

(87) PCT Pub. No.: WO2017/082799
PCT Pub. Date: May 18, 2017

(65) Prior Publication Data
US 2019/0069192 A1  Feb. 28, 2019

Related U.S. Application Data

(60) Provisional application No. 62/255,972, filed on Nov. 9, 2015.

(51) Int. Cl.
*H04W 24/10* (2009.01)
*H04W 76/10* (2018.01)
*H04W 76/28* (2018.01)

(52) U.S. Cl.
CPC .......... *H04W 24/10* (2013.01); *H04W 76/10* (2018.02); *H04W 76/28* (2018.02)

(58) Field of Classification Search
CPC ...... H04W 24/10; H04W 76/28; H04W 76/10
See application file for complete search history.

(56) References Cited

U.S. PATENT DOCUMENTS 9,723,507 B2 * 8/2017 Edara ............. H04W 76/28
10,225,753 B2 * 3/2019 Ljung ............ H04W 76/28
(Continued)

FOREIGN PATENT DOCUMENTS

EP  3 304 967   4/2018
EP  3 363 253   8/2018
(Continued)

OTHER PUBLICATIONS

Improving LTE/LTE-A UE POwer Efficiency with extended DRX cycle, Kim et al, IEEE, 2014 (Year: 2014).*
(Continued)

*Primary Examiner* — Habte Mered
(74) *Attorney, Agent, or Firm* — Baker Botts, LLP

(57) ABSTRACT

According to some embodiments, a method in a wireless device capable of operating in discontinuous activity mode comprises: determining that the wireless device is configured with a discontinuous reception (DRX) cycle longer than a DRX threshold; obtaining a reduced measurement group comprising a set of one or more cells or carriers to be measured; comparing a signal level of the serving cell at the wireless device with a signal threshold; and when the signal level of the serving cell at the wireless device is below the signal threshold, performing a measurement on the set of one or more cells or carriers of the reduced measurement group. Some embodiments include obtaining a normal measurement group comprising a set of one or more cells or carriers to be measured and measuring the normal measurement group when the signal level is equal to or above the signal threshold.

22 Claims, 9 Drawing Sheets

(56) References Cited

U.S. PATENT DOCUMENTS

| | | | |
|---|---|---|---|
| 2008/0181127 A1 | 7/2008 | Terry et al. | |
| 2012/0314635 A1 | 12/2012 | Lee et al. | |
| 2015/0373598 A1* | 12/2015 | Tsuboi | H04W 16/32 |
| | | | 370/331 |
| 2016/0212642 A1* | 7/2016 | Ljung | H04W 76/28 |
| 2016/0286454 A1* | 9/2016 | Mager | H04W 36/0088 |
| 2017/0026861 A1* | 1/2017 | Tseng | H04B 17/318 |
| 2017/0273022 A1* | 9/2017 | Kazmi | H04W 52/0216 |
| 2018/0323884 A1* | 11/2018 | Ku | H04W 24/08 |

FOREIGN PATENT DOCUMENTS

| | | |
|---|---|---|
| WO | 2010 078365 A1 | 7/2010 |
| WO | 2011 085270 A1 | 7/2011 |
| WO | 2011 136716 A1 | 11/2011 |
| WO | 2013 124330 A1 | 8/2013 |
| WO | 2016 190798 A2 | 1/2016 |
| WO | 2016 136958 A1 | 9/2016 |

OTHER PUBLICATIONS

3GPP TS 36.133; Technical Specification; 3rd Generation Partnership Project; Technical Specification Group Radio Access Network; Evolved Universal Terrestrial Radio Access (E-UTRA); Requirements for support of radio resource management (Release 13) (due to size, this reference has been split into three parts)—Sep. 2015.

3GPP TS 25.133 v12.8.0; Technical Specification; 3rd Generation Partnership Project; Technical Specification Group Radio Access Network; Requirements for support of radio resource management (FDD) (Release 12)—Jul. 2015.

PCT International Search Report for International application No. PCT/SE2016/051075—dated Jan. 12, 2017.

PCT Written Opinion of the International Searching Authority for International application No. PCT/SE2016/051075—dated Jan. 12, 2017.

EPO issued Extended European Search Report for Application No./Patent No. 16864666.9-1231 / U.S. Pat. No. 3,375,245 PCT/SE2016051075—dated May 31, 2019.

* cited by examiner

MEASURING MULTIPLE CARRIERS UNDER DISCONTINUOUS ACTIVITY

PRIORITY

This nonprovisional application is a U.S. National Stage Filing under 35 U.S.C. § 371of International Patent Application Serial No. PCT/SE2016/051075 filed Nov. 2, 2016, and entitled "MEASURING MULTIPLE CARRIERS UNDER DISCONTINUOUS ACTIVITY" which claims priority to U.S. Provisional Patent Application No. 62/252, 972 filed Nov. 9, 2015, both of which are hereby incorporated by reference in their entirety.

TECHNICAL FIELD

Particular embodiments are directed to wireless communications and, more particularly, to a wireless device that measures multiple carriers while operating under discontinuous activity with long inactivity periods.

BACKGROUND

As more carriers become available and traffic increases, operators are increasing the number of carriers in their networks. A functionality referred to as increased monitoring (IncMon) in both Third Generation Partnership Project (3GPP) Universal Terrestrial Radio Access (UTRA) (25.133) and Long Term Evolution (LTE) (36.133 Release 13) specifications facilitates performing measurements on an increased number of carriers. IncMon was developed in response to the increased number of carriers an operator uses. For example, if a user equipment (UE) attempts to measure all carriers with the same priority, the measurement delay might be very large for all carriers. IncMon identifies the carriers that are more important to have a short measurement delay and those that are less delay sensitive (e.g., carriers with a lower probability that they are needed for coverage).

Without IncMon functionality, a UE operating according to the UTRA specification is required to perform measurements on cells distributed on at least two inter-frequency carriers in addition to the cells on the serving carrier frequency (intra-frequency carrier). This requirement may limit an operator's practice of attempting equal usage of all available carriers. For example, this requirement may cause problems when deploying low power node cells (e.g., pico or femto-cells) on a separate carrier (dedicated carrier). A carrier frequency (also referred to simply as a carrier or a frequency) may also be referred to as a frequency layer (or simply layer). A Global System for Mobile (GSM) layer comprises 32 GSM carriers. For other 3GPP radio access technologies (RATs), such as LTE, a layer equals the carrier frequency. Measuring on several carriers at the same, or overlapping, time may be referred to as multiple layer monitoring or measurement. The term monitoring herein may refer to performing one or more measurements on one or more carrier frequencies.

In E-UTRAN specifications, the UE is required to perform measurements on cells distributed on at least 3 inter-frequency carriers (i.e., 3 for E-UTRA frequency division duplex (FDD) and 3 for E-UTRA time division duplex (TDD)), in addition to the cells on the serving carrier frequency. This may be a significant limitation given the amount of spectrum that operators typically have and their advanced deployment scenarios, like heterogeneous networks, as described below.

In both UTRAN and E-UTRAN, when IncMon is not supported, the UE is limited in the total number of carriers that the UE is required to measure. In both systems the UE is required to measure up to 7 non-serving carriers, including inter-frequency and inter-RAT carriers. This requirement is specified for measurements in a low activity radio resource control (RRC) state (e.g., idle state, idle mode, CELL_PCH state, URA_PCH state, etc.) as well as in a high activity RRC state (e.g., connected, CELL_DCH, CELL_FACH states). Examples of inter-RAT carriers in UTRAN FDD belong to GSM/GERAN, UTRA TDD, E-UTRA FDD and E-UTRA TDD systems. Examples of inter-RAT carriers in E-UTRAN FDD belong to GSM/GERAN, UTRA FDD, UTRA TDD, E-UTRA TDD, CDMA 2000 and HRPD systems.

A heterogeneous network is based on a multilayered deployment of a high power node (HPN), such as macro base station (BS) (wide area BS serving a macro cell), and a low power node (LPN), such as pico BS (local area BS serving a pico cell). Other examples of LPNs are home BS serving femto cell or medium range BS serving a micro cell. The LPNs and HPNs may operate on the same frequency (e.g., co-channel heterogeneous deployment) or on different frequencies (e.g., inter-frequency, multi-carrier or multi-frequency heterogeneous deployment).

For a heterogeneous deployment on several carriers, adding neighbor cell information in the macro network may not be possible because two of the inter-frequencies are already used in the macro network. Thus, the mobile will not perform cell-reselection or any kind of cell change (e.g., handover) when entering the coverage area of the LPN.

Based on these new deployment scenarios, a purpose of IncMon is to add new carriers without increasing measurement delays to the most sensitive carriers. With this function the measurement delay of the "normal" set of carriers provides similar delay as for the case with a limited number of carriers. The set of carriers with reduced requirements share a smaller part of the measurement resources between each other. Therefore, the measurement delay may be long. The result is that a UE is able to control these carriers but not able to make a fast cell reselection or handover based on these measurements.

Another consideration of network operators is conserving power consumption. Power consumption is important for UEs using battery or an external power supply. Its importance increases with the continued growth of device populations and more demanding use cases. The importance may be illustrated by following scenarios.

As an example, for machine-to-machine M2M operation (e.g., sensors that run on battery), on-site exchange (or charging) of the batteries for a large amount of devices is a major cost. The battery lifetime may even determine the device's lifetime if it is not foreseen to charge or replace the battery. Even where UEs may consume power from an external power supply, consuming less power may be desirable for energy efficiency purposes.

Enhancing discontinuous reception (DRX) operation is one way to improve battery consumption in a UE. DRX makes the UE reachable during pre-defined occasions without resulting in unnecessary signaling. As currently defined, DRX cycles in LTE can at most be 2.56 seconds. This cycle duration may not allow for sufficient power savings for UEs that only need to wake-up infrequently (e.g., every few or tens of minutes) for data. Hence, DRX cycle extension may be used to enable significant battery savings for such UEs. Furthermore, the DRX cycle can be set depending on the data delay tolerance and power saving requirements, thus providing a flexible solution for achieving significant UE battery savings. With the extended DRX functionality, the DRX cycle may be extended to be, for example, up to 1 or several hours. There may also be a few "short" DRX cycles active where the UE can be paged (e.g., when in IDLE state). The UE can go to deep sleep during a long period (extended DRX) until it wakes up for the next set of paging intervals with short DRX cycle.

When multiple carriers are in use, during the extended DRX the UE can measure all configured carriers during the set of short DRX cycles. Measurements from the previous set of short DRX cycles may be too old to use for an accurate averaging of different samples over time. Instead, several measurement samples may be needed from each set of short DRX cycles. Therefore, during the few short DRX cycles, all carriers may need to be measured several times to achieve accurate measurement averaging to enhance measurement performance, especially in fading conditions.

3GPP defines eDRX operation for UEs in CONNECTED mode in LTE and for UEs in IDLE mode in LTE and UTRA. In LTE, the eDRX in IDLE is based on the hyper-system frame number (H-SFN) concept. More details on H-SFN are provided below.

For CONNECTED mode, the DRX cycle may extend up to 10.24 s. FIGS. 1A and 1B illustrate examples of the extended DRX cycle.

FIG. 1A is an example enhanced discontinuous reception (eDRX) configuration. The horizontal axis represents time. The illustrated example includes a short DRX period ($T_{DRX}$) followed by an extended DRX period ($T_{eDRX}$). The short DRX period includes a sequence of short on-durations 10 separated by short off-durations. The extended DRX period includes a sequence of long on-durations 12 separated by long off-durations.

FIG. 1B is another example enhanced discontinuous reception (eDRX) configuration. The horizontal axis represents time. The illustrated example includes an extended DRX period ($T_{eDRX}$). The extended DRX period includes a sequence of long on-durations 12 separated by long off-durations. One long on-duration includes a short DRX period ($T_{DRX}$). The short DRX period includes a sequence of short on-durations 10 separated by short off-durations.

In idle mode, the H-SFN may extend the current SFN range, which is limited to 0 to 1023. An example is depicted in FIG. 2A.

FIG. 2A illustrates an example hyper-system frame number (H-SFN) cycle. The horizontal axis represents time. The illustrated example uses 10 bits of extension, where each hyper SFN contains 1024 SFNs, and therefore spans across 10.24 seconds. For example, H-SFN 0 includes 1024 SFNs spanning 10.24 seconds, following by H-SFN 1 that also includes 1024 SFNs, and so on up to H-SFN 1023, where the cycle repeats at H-SFN 0.

For extended idle mode DRX, the paging frames for the UE consist of: (1) H-SFN value or values that provide the hyper frame/frames at which the UE may be paged (i.e., the paging hyper-frames (PH)); and (2) SFN value or values that provide the legacy frame/frames at which the UE expects to be paged within each paging hyper-frame. The legacy paging frames are within a paging window (PW). An example is illustrated in FIG. 2B.

FIG. 2B illustrates an example of H-SFN based paging for eDRX. The horizontal axis represents time. The extended DRX period ($T_{eDRX}$) includes an H-SFN cycle as described with respect to FIG. 2A. The extended DRX period includes a paging hyper-frame at H-SFN-X. H-SFN-X includes normal DRX cycle ($T_{DRX}$). The normal SRX cycle includes paging frames (PF) where the UE may be paged within the hyper frame H-SFN-X.

In eDRX for UTRA (for IDLE UEs), the eDRX cycle is prolonged to between 10 s and up to several hours, which is much longer than the legacy DRX cycles. The DRX cycle consists of a long sleep period, then the UE wakes up to a Paging Transmission Window where there are N_PTW paging occasions with the legacy PS DRX cycle. An example is illustrated in FIG. 3.

FIG. 3 illustrates an example eDRX in UTRA. The horizontal axis represents time. The eDRX cycle includes long sleep periods 16 and paging transmission windows (PTWs) 14. A UE wakes up during PTW 14, which includes a plurality of paging occasions 18 according to a legacy PS DRX cycle.

Next generation of mobile systems (e.g., 5G) may include very long DRX cycles. For 5G downlink transmissions, the rate of symbols to measure in time on each carrier may be low. In some cases, the rate may be as low as one sequence every 100 ms. Because all the carriers may not be synchronized, each measurement sample in 5G will take a long time. Delays will further increase when the measurements on existing 3GPP RATs are added to the new set of carriers for 5G.

The DRX operations described above have particular disadvantages when a user equipment measures on multiple carriers. For example, the number of measurement samples for each set of DRX cycles is large and the time for performing the measurements is limited.

As another example, IncMon may not be compatible with extended DRX because the delay between the extended DRX cycles may be too long. Averaging between the extended DRX cycles may not be accurate because the user equipment may have traveled a considerable distance between extended DRX cycles.

As another example, the extended DRX is intended to save power. Always measuring many carriers in extended DRX, however, may not result in power savings.

The alternatives described in the Background section are not necessarily alternatives that have been previously conceived or pursued. Therefore, unless otherwise indicated herein, the alternatives described in the Background section are not prior art to the claims in this application and are not admitted to be prior art by inclusion in the Background section.

SUMMARY

Extended discontinuous receptions (eDRX) operations have particular disadvantages when a user equipment measures on multiple carriers. For example, the number of measurement samples for each set of DRX cycles is large and the time for performing the measurements is limited. Averaging measurements taken between extended DRX cycles may not be accurate if the user equipment has traveled some distance between eDRX cycles.

Accordingly, particular embodiments may limit the number of carriers that a user equipment measures when the user equipment is operating according to a discontinuous activity configuration with long inactivity periods. For example, under a first set of conditions, the user equipment measures a smaller number of carriers, and under a second set of conditions the user equipment measures a larger number of carriers.

According to some embodiments, a method in a wireless device capable of operating in discontinuous activity mode comprises: determining that the wireless device is configured with a discontinuous reception (DRX) cycle longer than a DRX threshold; obtaining a reduced measurement group comprising a set of one or more cells or carriers to be measured; comparing a signal level of the serving cell at the wireless device with a signal threshold; and when the signal level of the serving cell at the wireless device is below the signal threshold, performing a measurement on the set of one or more cells or carriers of the reduced measurement group. The method may further comprise obtaining a normal measurement group comprising a set of one or more cells or carriers to be measured; and when the signal level of the serving cell at the wireless device is equal to or above the signal threshold, performing a measurement on the set of one or more cells or carriers of the normal measurement group. The method may further include performing an operational task, such as handover or cell reselection, using a measurement result of at least one of the measurements on the set of one or more cells or carriers of the reduced measurement group or one of the measurements on the set of one or more cells or carriers of the normal measurement group.

In particular embodiments, determining the wireless device is configured with the DRX cycle longer than the DRX threshold comprises determining that the wireless device is configured with an eDRX cycle longer than 20.48 seconds. Obtaining the normal measurement group and obtaining the reduced measurement group may comprise at least one of receiving a measurement group configuration from a network node, obtaining a pre-defined configuration of the wireless device, or determining autonomously.

In particular embodiments, the method further comprises: obtaining a normal set of one or more time resources to use for measurement and a normal set of one or more measurements; and obtaining a reduced set of one or more time resources to use for measurement and a reduced set of one or more measurements. Performing the measurement on the set of one or more cells or carriers of the normal measurement group comprises performing at least one measurement of the normal set of one or more measurement types using at least one time resource of the normal set of one or more time resources; and performing the measurement on the set of one or more cells or carriers of the reduced measurement group comprises performing at least one measurement of the reduced set of one or more measurement types using at least one time resource of the reduced set of one or more time resources.

In particular embodiments, the signal level of the serving cell at the wireless device includes a receive level (Srxlev) and a quality (Squal), and the signal threshold is 3 dB for at least one of Srxlev and Squal. Performing the measurement on the set of one or more cells or carriers of the reduced measurement group may comprise measuring common pilot channel (CPICH) Ec/Io and CPICH received signal code power (RSCP) at least two times during a paging transmission window (PTW) cycle in every DRX cycle length. Performing the measurement on the set of one or more cells or carriers of the reduced measurement group may comprise a first measurement rate, and performing the measurement on the set of one or more cells or carriers of the normal measurement group may comprise a second measurement rate. The second measurement rate may be lower than the first measurement rate.

In particular embodiments, the reduced measurement group comprises a set of one or more cells or carriers S1 and the normal measurement group comprises a set of one or more cells or carriers S1+S2.

According to some embodiments, a method in a network node capable of operating in discontinuous activity mode comprises: receiving, from a wireless device, a measurement result of at least one of (a) a measurement on a set of one or more cells or carriers comprising a reduced measurement group if a signal level of a serving cell at the wireless device is below a signal threshold; or (b) a measurement on a set of one or more cells or carriers comprising a normal measurement group if the signal level of the serving cell at the wireless device is equal to or above the signal threshold; and performing an operational task using the received measurement result. The method may further comprise obtaining an indication that the wireless device is configured with a DRX cycle longer than a DRX threshold; and transmitting, to the wireless device, a configuration including at least one of: (a) the reduced measurement group, the reduced measurement group comprising the set of one or more cells or carriers to be measured; and (b) the normal measurement group, the normal measurement group comprising the set of one or more cells or carriers to be measured.

In particular embodiments, determining the wireless device is configured with the DRX cycle longer than the DRX threshold comprises determining that the wireless device is configured with a DRX cycle longer than 20.48 seconds. The configuration for the reduced measurement group may comprise a first measurement rate and the configuration for the normal measurement group may comprise a second measurement rate. The second measurement rate may be higher than the first measurement rate.

According to some embodiments, a wireless device capable of operating in discontinuous activity mode comprises processing circuitry. The processing circuitry is operable to: determine that the wireless device is configured with a DRX cycle longer than a DRX threshold; obtain a reduced measurement group comprising a set of one or more cells or carriers to be measured; compare a signal level of the serving cell at the wireless device with a signal threshold; and when the signal level of the serving cell at the wireless device is below the signal threshold, perform a measurement on the set of one or more cells or carriers of the reduced measurement group. The processing circuitry may be further operable to obtain a normal measurement group comprising a set of one or more cells or carriers to be measured; and when the signal level of the serving cell at the wireless device is equal to or above the signal threshold, perform a measurement on the set of one or more cells or carriers of the normal measurement group. The processing circuitry may be further operable to perform an operational task using a measurement result of at least one of the measurements on the set of one or more cells or carriers of the reduced measurement group or one of the measurements on the set of one or more cells or carriers of the normal measurement group. The operational task may comprise performing cell reselection.

In particular embodiments, the processing circuitry is operable to determine the wireless device is configured with the DRX cycle longer than a DRX threshold of 20.48 seconds. The processing circuitry may be operable to obtain the normal measurement group and obtain the reduced measurement group by at least one of receiving a measurement group configuration from a network node, obtaining a pre-defined configuration of the wireless device, or determining autonomously. The processing circuitry may be further operable to: obtain a normal set of one or more time resources to use for measurement and a normal set of one or more measurements; obtain a reduced set of one or more time resources to use for measurement and a reduced set of one or more measurements; perform the measurement on the set of one or more cells or carriers of the normal measurement group by performing at least one measurement of the normal set of one or more measurement types using at least one time resource of the normal set of one or more time resources; and perform the measurement on the set of one or more cells or carriers of the reduced measurement group by performing at least one measurement of the reduced set of one or more measurement types using at least one time resource of the reduced set of one or more time resources.

In particular embodiments, the signal level of the serving cell at the wireless device includes a receive level (Srxlev) and a quality (Squal), and the signal threshold is 3 dB for at least one of Srxlev and Squal. The processing circuitry is operable to perform the measurement on the set of one or more cells or carriers of the reduced measurement group by measuring common pilot channel (CPICH) Ec/Io and CPICH received signal code power (RSCP) at least two times during a paging transmission window (PTW) cycle in every DRX cycle length.

In particular embodiments, the processing circuitry is operable to perform the measurement on the set of one or more cells or carriers of the reduced measurement group at a first measurement rate and perform the measurement on the set of one or more cells or carriers of the normal measurement group at a second measurement rate. The second measurement rate may be lower than the first measurement rate. The reduced measurement group may comprise a set of one or more cells or carriers S1 and the normal measurement group comprises a set of one or more cells or carriers S1+S2.

According to some embodiments, a network node capable of operating in discontinuous activity mode comprises processing circuitry. The processing circuitry is operable to: receive, from a wireless device, a measurement result of at least one of: (a) a measurement on a set of one or more cells or carriers comprising a reduced measurement group if a signal level of a serving cell at the wireless device is below a signal threshold; or (b) a measurement on a set of one or more cells or carriers comprising a normal measurement group if the signal level of the serving cell at the wireless device is equal to or above the signal threshold; and perform an operational task, such as RRM, using the received measurement result. The processing circuitry may be further operable to: obtain an indication that the wireless device is configured with a discontinuous reception (DRX) cycle longer than a DRX threshold; and transmit, to the wireless device, a configuration including at least one of: (a) the reduced measurement group, the reduced measurement group comprising the set of one or more cells or carriers to be measured; and (b) the normal measurement group, the normal measurement group comprising the set of one or more cells or carriers to be measured.

In particular embodiments, the processing circuitry is operable to determine the wireless device is configured with the DRX cycle longer than a DRX threshold of 20.48 seconds. The configuration for the reduced measurement group may comprise a first measurement rate and the configuration for the normal measurement group may comprise a second measurement rate. The second measurement rate may be higher than the first measurement rate.

According to some embodiments, wireless device capable of operating in discontinuous activity mode comprises a measuring module and a receiving module. The measuring module is operable to determine that the wireless device is configured with a discontinuous reception (DRX) cycle longer than a DRX threshold. The receiving module is operable to obtain a reduced measurement group comprising a set of one or more cells or carriers to be measured. The measuring module is further operable to: compare a signal level of the serving cell at the wireless device with a signal threshold; and when the signal level of the serving cell at the wireless device is below the signal threshold, perform a measurement on the set of one or more cells or carriers of the reduced measurement group.

According to some embodiments, a network node capable of operating in discontinuous activity mode comprises a receiving module and a communication module. The receiving module is operable to receive, from a wireless device, a measurement result of at least one of: (a) a measurement on a set of one or more cells or carriers comprising a reduced measurement group if a signal level of a serving cell at the wireless device is below a signal threshold; or (b) a measurement on a set of one or more cells or carriers comprising a normal measurement group if the signal level of the serving cell at the wireless device is equal to or above the signal threshold. The communication module is operable to perform an operational task using the received measurement result.

Also disclosed is a computer program product. The computer program product comprises instructions stored on non-transient computer-readable media which, when executed by a processor, performs the act of determining that the wireless device is configured with a discontinuous reception (DRX) cycle longer than a DRX threshold; obtaining a reduced measurement group comprising a set of one or more cells or carriers to be measured; comparing a signal level of the serving cell at the wireless device with a signal threshold; and when the signal level of the serving cell at the wireless device is below the signal threshold, performing a measurement on the set of one or more cells or carriers of the reduced measurement group.

In another computer program product, the computer program product comprises instructions stored on non-transient computer-readable media which, when executed by a processor, performs the acts of receiving, from a wireless device, a measurement result of at least one of (a) a measurement on a set of one or more cells or carriers comprising a reduced measurement group if a signal level of a serving cell at the wireless device is below a signal threshold; or (b) a measurement on a set of one or more cells or carriers comprising a normal measurement group if the signal level of the serving cell at the wireless device is equal to or above the signal threshold; and performing an operational task using the received measurement result.

Particular embodiments may exhibit some of the following technical advantages. For example, some embodiments facilitate low power consumption by a wireless device by limiting measurement activity. Mobility performance of a wireless device may be improved by measuring on the highest prioritized carriers, while measurements on all other carriers are still supported when needed (e.g., from a coverage point of view). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1A:
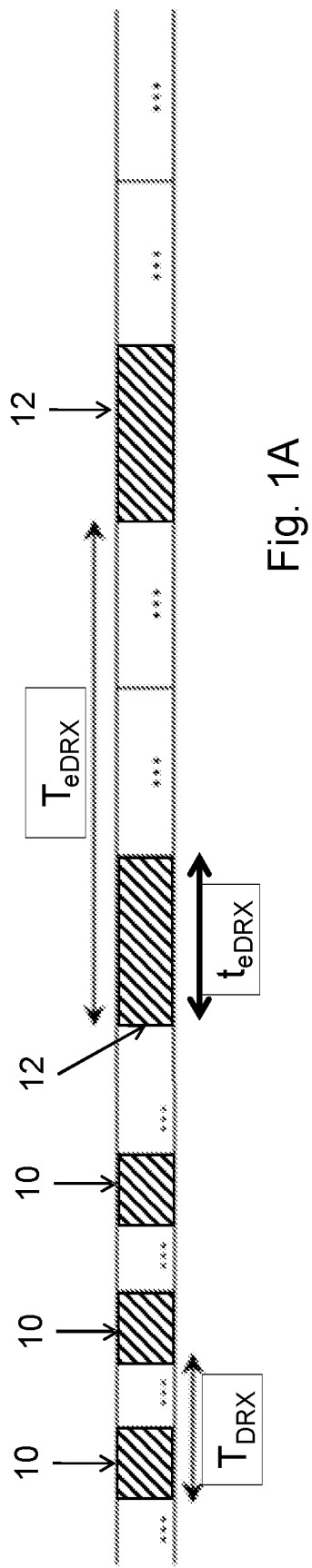
FIG. 1A is an example enhanced discontinuous reception (eDRX) configuration.
Figure 1B:
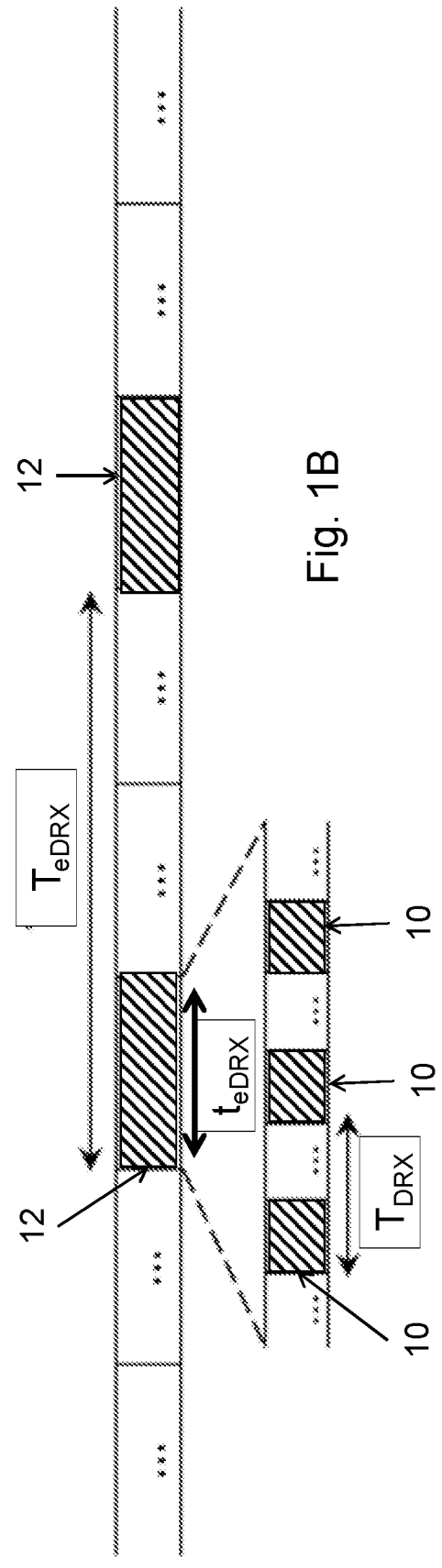
FIG. 1B is another example eDRX configuration.
Figure 2A:
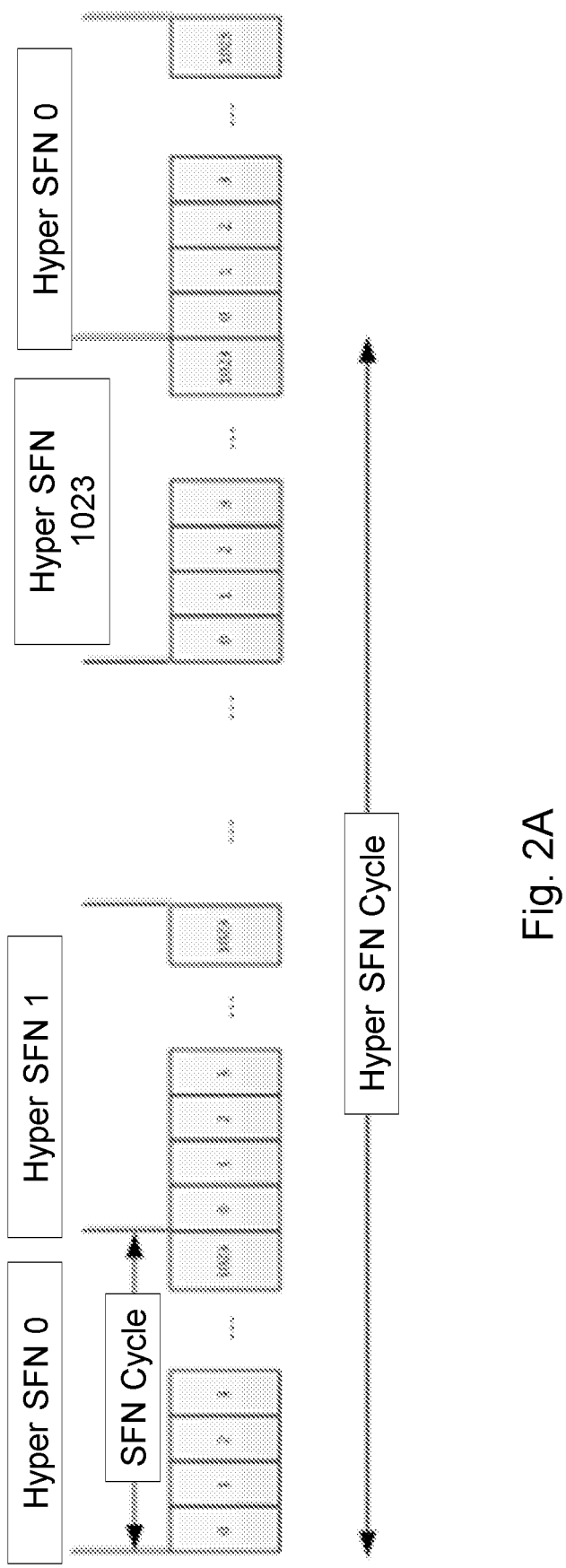
FIG. 2A illustrates an example hyper-system frame number (H-SFN) cycle.
Figure 2B:
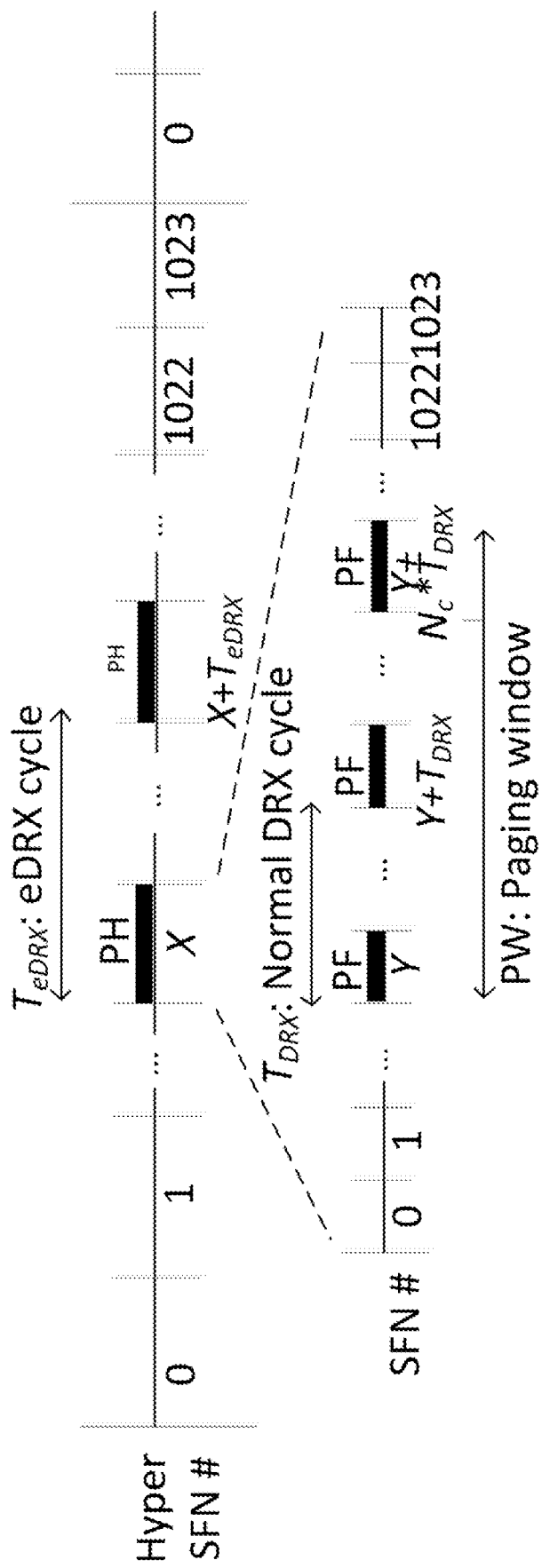
FIG. 2B illustrates an example of H-SFN based paging for eDRX.

As network operators increase the number of carriers in their networks, a wireless device, such as a Third Generation Partnership Project (3GPP) user equipment (UE), performs measurements on an increased number of carriers. If a UE were to measure all carriers with the same priority, the measurement delay might be significant for all carriers. This may cause problems when deploying heterogeneous networks.

Another consideration of network operators is conserving power consumption. Power consumption is important for UEs using battery or an external power supply, such as machine-to-machine M2M operation.

Enhancing discontinuous reception (DRX) operation is one way to improve battery consumption in a UE. DRX makes the UE reachable during pre-defined occasions without resulting in unnecessary signaling. The DRX cycle may be set depending on the data delay tolerance and power saving requirements, thus providing a flexible solution for achieving significant UE battery savings. The DRX cycle may be extended to be, for example, up to 1 or several hours. The UE can go to deep sleep during a long period (extended DRX) until it wakes up for the next set of paging intervals with short DRX cycle.

When multiple carriers are in use, during the extended DRX the UE can measure all configured carriers during the set of short DRX cycles. Measurements from the previous set of short DRX cycles may be too old to use for an accurate averaging of different samples over time. Instead, several measurement samples may be needed from each set of short DRX cycles. Therefore, during the few short DRX cycles, all carriers may need to be measured several times to achieve accurate measurement averaging to enhance measurement performance, especially in fading conditions.

Next generation of mobile systems (e.g., 5G) may include very long DRX cycles. For 5G downlink transmissions, the rate of symbols to measure in time on each carrier may be low. In some cases, the rate may be as low as one sequence every 100 ms. Because all the carriers may not be synchronized, each measurement sample in 5G will take a long time. Delays will further increase when the measurements on existing 3GPP RATs are added to the new set of carriers for 5G.

A particular disadvantage when a user equipment measures on multiple carriers is that the number of measurement samples for each set of DRX cycles may be large and the time for performing the measurements may be limited. Another disadvantage is that IncMon may not be compatible with extended DRX because the delay between the extended DRX cycles may be too long. Averaging between the extended DRX cycles may not be accurate because the user equipment may have traveled a considerable distance between extended DRX cycles. As another example, the extended DRX is intended to save power. Always measuring many carriers in extended DRX, however, may not result in power savings.

An object of the present disclosure is to obviate at least the disadvantages above and provide a system that limits the number of carriers that a user equipment measures when the user equipment is operating according to a discontinuous activity configuration with long inactivity periods. For example, under a first set of conditions, the user equipment measures a smaller number of carriers, and under a second set of conditions the user equipment measures a larger number of carriers. A particular advantage is that mobility performance of a wireless device may be improved by measuring on the highest prioritized carriers, while measurements on all other carriers are still supported when needed (e.g., from a coverage point of view). Particular embodiments limit a UE's measurement activities when mobility does not require measurements on many carriers in order to save power.

In general, a UE may measure on a first set of carriers (also referred to as a normal set) which can be measured under a first set of conditions (e.g., every DRX cycle when the UE is configured with eDRX, even in good coverage conditions). When a second set of conditions applies (e.g., when the UE determines that it is about to lose downlink coverage) the UE may measure on a second set of carriers (also referred to as a reduced set). The first set of carriers may be a more limited set compared to the second set. The second set may be a reduced set in the IncMon discussions.

A UE may determine that the UE is configured with a DRX cycle longer than a DRX_threshold. The UE may measure at least one type of signal level (e.g., signal quality such as RSRQ) from a serving cell and may compare the signal level with a signal threshold. The UE performs one or more measurements on one or more cells of the normal set of carriers and the reduced set of carriers according to the following conditions.

If the received signal level (e.g., signal quality and signal strength) from the serving cell is equal to or better than the signal threshold (i.e., the first set of conditions is met), then the UE measures on one or more cells of the carriers belonging to a normal performance group. Otherwise, if the signal level (e.g., signal quality and/or signal strength) from the serving cell is worse than the signal threshold (i.e., degraded), meaning that the second set of conditions is met, then the UE measures on one or more cells of the carriers belonging to a reduced performance group. Optionally, the measurements on cells on the carriers of the reduced performance group may be performed during each, or a subset of, the active time (e.g., PTWs, ON duration, etc.) of the DRX cycle.

The measurement rate on carriers within the reduced performance group may be lower than the normal set of carriers. This may also apply when these carriers are measured based on the received signal level. As long as the measurements of the candidate cells are compared with the serving cell, then the measurements may be spread out between different sets of the short DRX cycle. From a power consumption point of view, however, all carriers may be measured in one set of short DRX cycles.

Particular embodiments are described with reference to FIGS. 4-8B of the drawings, like numerals being used for like and corresponding parts of the various drawings. LTE is used throughout this disclosure as an example cellular system, but the ideas presented herein apply to other wireless communication systems as well.

Figure 4:
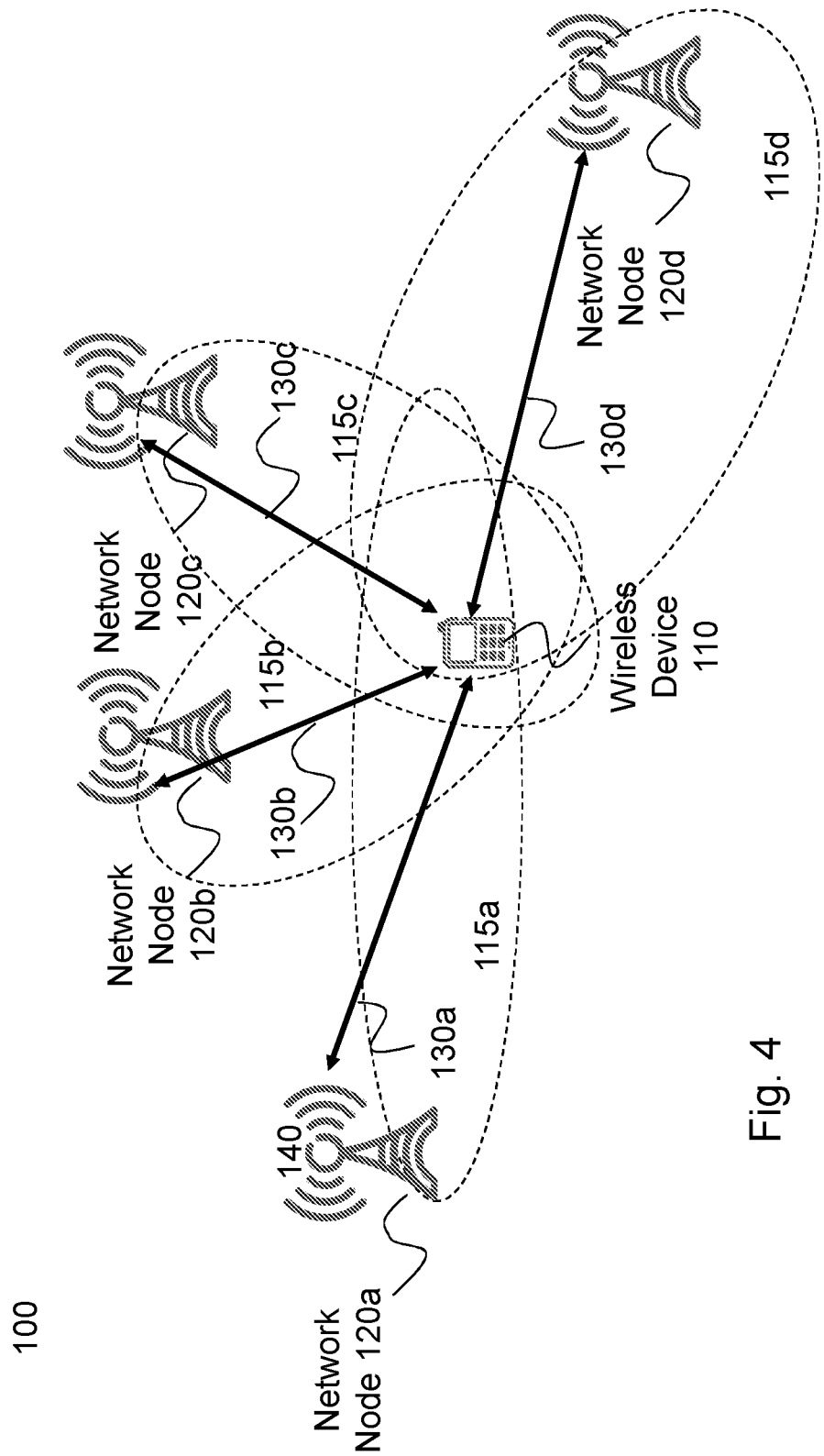
FIG. 4 is a block diagram illustrating an example wireless network, according some embodiments.

FIG. 4 is a block diagram illustrating an example of a network, according to a particular embodiment. Network 100 includes network nodes 120 (such as a base station or eNodeB) and wireless devices 110 (such as mobile phones, smart phones, laptop computers, tablet computers, M2M devices, D2D devices, or any other devices that can provide wireless communication). In general, wireless devices 110 that are within coverage of network node 120 communicate with network node 120 by transmitting and receiving wireless signals 130. For example, wireless devices 110 and network node 120 may communicate wireless signals 130 containing voice traffic, data traffic, and/or control signals. Wireless signals 130 may include both downlink transmissions (from network node 120 to wireless devices 110) and uplink transmissions (from wireless devices 110 to network node 120).

Some embodiments may use a non-limiting term user equipment (UE). The UE may refer to any type of wireless device 110 capable of communicating with a network node 120 or another wireless device 110 over radio signals, such as wireless signals 130. The UE may include a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, generic terminology such as "radio network node" or simply "network node (NW node)" is used. It may refer to any kind of network node such as a base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc. The term "radio node" as used herein may refer to a wireless device 110 or a network node 120.

Wireless device 110 may perform measurements on wireless signal 130. Particular examples of types of measurements include signal to noise ratio (SNR), block error rate (BLER), signal to interference plus noise ratio (SINR), reference signal received power (RSRP), reference signal received quality (RSRQ), reference signal SINR (RS-SINR), received signal strength indicator (RSSI), common pilot channel (CPICH) received signal code power (RSCP), received signal time difference (RSTD), etc.

In particular embodiments, radio node (e.g., wireless device 110 or network node 120) activity may comprise, for example, any operation or activity for receiving and/or transmitting one or more signals from and/or to a cell. Examples of operation or activity include performing one or more of: a measurement such as the measurements specified in 3GPP TS 36.214 or TS 25.215, performing measurements such as intra-frequency measurements for more than one cell, inter-frequency measurements over more than one carrier, etc., CQI reporting, radio link monitoring (RLM), cell search, cell selection or reselection, handover, receiving a radio signal or channel or a physical signal, transmitting a radio signal or channel, etc. Specific examples of measurements include RSRP, RSRQ, UE Rx-Tx time difference, RSTD, SINR, SNR, cell global ID (CGI) or E-UTRA CGI (ECGI) identification delay, GSM carrier RSSI, IEEE 802.11 Beacon RSSI, CPICH RSCP, CPICH Ec/No etc. Specific examples of channels include PDCCH, PDSCH, E-PDCCH, M-PDCCH, M-PDSCH etc. Specific examples of physical signals include reference signals (RS) like discovery RS (DRS), CRS, CSI-RS, PSS/SSS, etc.

Network node 120 transmits and receives wireless signals 130 using antenna 140. In particular embodiments, network node 120 may comprise multiple antennas 140. For example, network node 120 may comprise a multi-input multi-output (MIMO) system with two, four, eight, or more antennas 140.

Particular embodiments may include single carrier, multicarrier or carrier aggregation (CA) operation. In carrier aggregation, the wireless device (e.g., wireless device 110) is able to receive and/or transmit data to more than one serving cell (e.g., cells 115a, 155b and 155c). Carrier aggregation may also be referred to as "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell may also be referred to as primary cell (PCell) or primary serving cell (PSC). Similarly, the secondary serving cell may be referred to as secondary cell (SCell) or secondary serving cell (SSC).

Particular embodiments may include discontinuous reception (DRX). Wireless device activity configuration may comprise one or more parameters characterizing wireless device activity such as activity cycle, DRX cycle, eDRX cycle, ON DURATION time, etc.

The long inactivity configuration (e.g., discontinuous activity with long inactivity periods, eDRX, extended DRX, long DRX, etc.) may, for example, include the following configurations. The inactivity period is above a threshold. The ratio of inactivity period to activity period in the same cycle is larger than a certain threshold or ratio of activity period to inactivity period in the same cycle is below a certain threshold. The wireless device, such as wireless device 110, has difficulty or is unable to combine or average samples from different activity cycles. The difficulty may result from any one or more of: (1) an implementation constraint, such as limited memory and/or processing resources; (2) different radio conditions during any two successive activity durations of the corresponding successive activity cycles; (3) a large difference (e.g., more than 6 dB) between the measurement samples obtained during any two successive activity durations of the corresponding successive activity cycles, etc.

The long inactivity configuration may include a relation between the number of downlink subframes per frame and the activity period and/or inactivity period of the wireless device activity configuration (e.g., fewer downlink subframes, such as 2 per frame, and long inactivity cycles, such as 10.24 seconds or longer). Another configuration may include a relation between the number of uplink subframes per frame and the activity period and/or inactivity period of the wireless device activity configuration. The long inactivity configuration may include eDRX (as described in the background section).

Some embodiments may use the term "short inactivity." The short inactivity configuration may be, for example, a configuration characterized by the inactivity period below a threshold. One example of the short inactivity configuration is a legacy DRX configuration with DRX cycle lengths not exceeding 2.56 seconds in LTE and 5.12 seconds in UTRA. In multi-level activity configuration, a wireless device, such as wireless device 110, may be configured with a short and a long activity cycles in a consecutive manner or in parallel or with short cycles being configured within an activity window (e.g., a paging window) of a the long activity cycle. A short activity/inactivity period configuration may be referred to as DRX, and a long activity/inactivity period configuration may be referred to as eDRX.

The short and long inactivity configurations may also differ with respect to their activity level and/or inactivity level and/or total cycle length in time (i.e., the sum of activity and inactivity durations) within one cycle or period. Each period or cycle may comprise an activity duration (e.g., ON duration) and an inactivity duration (e.g., OFF duration).

The wireless device, such as wireless device 110, handling of short and long inactivity configurations may depend on the wireless device's capability to combine or average measurement samples or snapshots obtained in two successive ON durations or paging windows and the ability to use the combined results for one or more operations. Examples of operations include radio measurements, time and/or frequency synchronization or tracking, channel estimation, estimation of Doppler, etc.

For example, if wireless device 110 can average at least two measurement samples of reference signals received from serving cell 115a during two successive ON durations or paging window of a DRX cycle of certain length (e.g., 2.56 seconds), then the DRX cycle belongs to the category of short inactivity configuration. In another example, if wireless device 110 cannot average measurement samples of reference signals received from serving cell 115a during two successive ON durations or paging windows of a DRX cycle of length (e.g., 20.48 seconds), then the DRX cycle belongs to the category of long inactivity configuration. In particular embodiments, the terms "periodicity" and "cycle" may be used interchangeably.

In particular embodiments, a wireless device, such as wireless device 110, configured with discontinuous activity with long inactivity periods is further configured with at least two sets of measurements, each associated with the corresponding (first or second, respectively) measurement configuration and the corresponding (first or second, respectively) set of time resources. Wireless device 110 may perform at least one of the at least two sets of measurements. Optionally, each of the sets of time resources may be further associated with a set of conditions which determine when wireless device 110 should perform the first set of measurements (in the first set of time resources) and when wireless device 110 should perform the second set of measurements (in the second set of time measurements).

In particular embodiments, the first and the second sets of time resources are not the same and may or may not overlap and may or may not be comprised in the same time interval. For example, the first set of time resources and the second set of time resources may comprise non-overlapping time intervals. As another example, during a time interval comprising the first set of time resources, only the first set of measurements may be performed based on the first measurement configuration, while the second set of measurements is complimentary to the first set of measurements when the second set of conditions is met and thus performed in a time interval comprising both the first and the second set of time resources.

In particular embodiments, the first and the second measurement configurations are not the same and differ in at least one parameter. For example, the first set may comprise fewer carrier frequencies than the second set. As another example, the first measurement configuration may comprise a smaller measurement bandwidth for at least one carrier frequency, while the set of carrier frequencies may or may not be the same in the first and the second measurement configurations.

In particular embodiments, the first and the second sets of measurements may or may not be the same and may or may not overlap. For example, the first set may comprise fewer measurements than the second set.

As a particular example, when a serving cell signal is above a threshold, K1 carrier frequencies are measured, and when a serving cell signal is below a threshold, K1+K2 carrier frequencies are measured. As another example, when a first set of conditions is met, a set of cells {S1} is measured, and when a second set of conditions is met, a union of {S1} and {S2} are measured. As another example, when a first set of conditions is met, a set of cells {S1} is measured, and when a second set of conditions is met, a set of cells {S2} is measured. As another example, when a first set of conditions is met, the first set of measurements is performed with lower performance (based on the first measurement configuration), and when a second set of conditions is met, the second set of measurements (in this example, the same as the first set of measurements) is performed with better performance (based on the second measurement configuration). In this example, the corresponding first and the second sets of time resources are non-overlapping in time.

Example measurement configuration may, for example, include any one or more of: (1) the number of carrier frequencies; (2) one or more of certain carrier frequencies; (3) the number of frequency bands; (4) one or more of certain frequency bands; (5) one or more of frequency resources; (6) one or more bandwidth (system bandwidth, measurement bandwidth, etc.) configurations; (7) number of cells or cell types (e.g., small cells, macro cells, etc.); and (8) one or more specific cells or cell types.

The first and the second measurement configurations may further (optionally) be associated with different priorities (e.g., measuring according to the first measurement configuration may have a lower priority than measuring according to the second measurement configuration). The priority may be pre-defined, determined autonomously by the wireless device (e.g., based on measurements or on configuration earlier received from the network) or by the network node, or received from another node (e.g., wireless device receives from a network node).

The first and second measurement configurations may be interchangeably referred to as measurement configuration associated with normal performance group and measurement configuration associated with reduced measurement configuration, respectively. For example, the first measurement configuration may be used by the network node to configure the wireless device to perform one or more measurements on one or more carriers belonging to the normal performance group, and the second measurement configuration may be used by the network node to configure the wireless device to perform one or more measurements on one or more carriers belonging to the reduced performance group.

In particular embodiments, one or more measurement performance requirements (or simply requirements) of one or more measurements of the same type on the carriers in the normal performance group are better than those of one or more measurements on the carriers in the reduced performance group. The performance difference between the measurements on carriers of different performance groups may be realized by one or more scaling factors (Ki). The set Ki may be pre-defined or signaled by the network node to the wireless device.

Carriers may interchangeably be referred to as layer, carrier frequency, channel, radio channel, component carrier, etc.

Non-limiting examples of measurement performance requirements associated with a measurement include: measurement period or measurement time (e.g., physical layer measurement period or L1 measurement period), time to identify a cell (e.g., cell search delay or PCI acquisition time), time to acquire the CGI or ECGI of a cell, measurement reporting delay, measurement accuracy, number of cells on which the UE can perform measurements over the measurement period, signal level (e.g., CPICH RSCP, RSRP, etc.) down to which certain requirement(s) is applicable, signal quality (e.g., CPICH Ec/No, CRS Es/Iot, SCH Es/Iot, etc.) down to which certain requirement(s) is applicable, maximum number of rate of uplink and/or downlink packet loss on serving cell when performing certain measurement on serving or neighbor cells, etc.

For example, wireless device 110 may perform RSRP and RSRQ measurement on cells 115 of N number of carriers in normal performance group within 2 seconds, whereas wireless device 110 may perform RSRP and RSRQ measurement on cells 115 of N number of carriers in reduced performance group within 10 seconds. Thus, the L1 measurement period of RSRP and RSRQ on carriers in the normal performance group is shorter (i.e., has better performance) compared to the L1 measurement period of RSRP and RSRQ on carriers in the reduced performance group.

An example set of time resources may, for example, include any one or more of: (1) all or some subframes (or other time units) during ON DURATION time; (2) all or some subframes (or other time units) during a paging window; (3) subframes according to a pattern; and (4) a first set of time resources is associated with the times when a first set of conditions is met, and a second set of time resources is associated with the times when a second set of conditions is met.

An example set of measurements may, for example, include any one or more of: (1) one or more measurement types; and (2) measurements for one or more purpose. Particular examples of types of measurements include SNR, BLER, SINR, RSRP, RSRQ, RS-SINR, RSSI, CPICH RSCP, RSTD, etc.

In particular embodiments, wireless device 110 determines that wireless device 110 is configured with a DRX cycle longer than a DRX threshold (e.g., eDRX cycle longer than 20.48 seconds). Wireless device 110 obtains a reduced measurement group comprising a set of one or more cells (e.g., cells 115c and 115d) or carriers (e.g., wireless signals 130c and 130d) to be measured. Wireless device 110 compares a signal level (e.g., Srxlev or Squal) of the serving cell (e.g., cell 115a) at wireless device 110 with a signal threshold (e.g., 3 db). When the signal level of the serving cell (e.g., cell 115a) at wireless device 110 is below the signal threshold (e.g., Srxlev<3 db or Squal<3 db), wireless device 110 performs a measurement on the set of one or more cells (e.g., cells 115c and 115d) or carriers (e.g., wireless signals 130c and 130d) of the reduced measurement group. Wireless device 110 may measure common pilot channel (CPICH) Ec/Io and CPICH received signal code power (RSCP) at least two times during a paging transmission window (PTW) cycle in every DRX cycle length.

In particular embodiments, wireless device 110 obtains a normal measurement group comprising a set of one or more cells (e.g., cells 115a and 115b) or carriers (e.g., wireless signals 130a and 130b) to be measured. When the signal level of the serving cell (e.g., cell 115a) at wireless device 110 is equal to or above the signal threshold (e.g., Srxlev>=3 db or Squal>=3 db), then wireless device 110 performs a measurement on the set of one or more cells (e.g., cells 115a and 115b) or carriers (e.g., wireless signals 130a and 130b) of the normal measurement group.

In particular embodiments, wireless device 110 may perform an operational task (e.g., cell reselection) using a measurement result of at least one of the measurements on the set of one or more cells or carriers of the reduced measurement group or one of the measurements on the set of one or more cells or carriers of the normal measurement group.

In particular embodiments, network node 120 receives, from wireless device 110, a measurement result of either a measurement on the normal performance group (e.g., cells 115a and 115b) or the reduced performance group (e.g., cells 115c and 115d). Network node 120 performs an operational task using the received measurement result.

In particular embodiments, network node 120 determines that wireless device 110 is configured with a DRX cycle longer than a DRX threshold. Network node 120 transmits, to wireless device 100, at least one of a normal measurement group and a reduced performance group.

In network 100, each network node 120 may use any suitable radio access technology, such as long term evolution (LTE), LTE-Advanced, LTE-NX, 4G, 5G, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below.

Particular embodiments include methods in a wireless device. A method in a wireless device capable of operating in discontinuous activity mode with long inactivity periods (i.e., long inactivity configuration) comprises an optional step where the wireless device receives from a first node at least one of: (1) a first and/or second measurement configuration; (2) a first and/or second sets of time resources; (3) a first and/or second sets of measurements; and (4) first and/or second priority associated with the first and second sets of measurements or with the first and second measurement configurations or with the first and second sets of time resources.

In particular embodiments, the wireless device obtains (e.g., determines autonomously, receives from a first radio node, or uses pre-defined configurations) the information necessary to configure the first and/or the second measurement configurations associated with the first and/or second sets of measurements to be performed in the firsts and second time resources. The wireless device may obtain a first measurement configuration, a first set of time resources, and a first set of measurements. The wireless device may obtain a second measurement configuration, a second set of time resources, and a second set of measurements.

When configured with a long inactivity configuration, the wireless device selectively applies the first and/or the second measurement configuration in the first and/or the second set of time resources. Selectively applying refers to applying a measurement configuration when one or more conditions or criteria are met.

An example of condition and criteria may include coverage level. Coverage level may be based on received signal level such as signal quality and/or signal strength with respect to one or more serving cells. Examples of signal quality include SNR, SINR, RS-SINR, BLER, etc. Examples of signal strength include RSRP, path loss, RSCP, etc. Another example condition or criteria may include whether a UE is within a particular geographical or logical area.

The wireless device performs the first set and/or the second sets of measurements, depending on the applied measurement configuration. The wireless device uses the first set and/or the second sets of measurements for one or more operational tasks, such as for RRM or for sending the measurements to a second radio node (may or may not be the same as the first radio node). The first and the second radio nodes may comprise a network node or a wireless device.

As a particular example, wireless device 110 may determine that wireless device 110 is configured with a DRX cycle longer than a DRX_threshold and measures at least one type of signal level (e.g., signal quality such as RSRQ) from serving cell 115a. Wireless device 110 compares the signal level with a signal threshold and performs one or more measurements on one or more cells of the normal set of carriers (e.g., cells 115a and 115b) and the reduced set of carriers (e.g., cells 115c and 115d) as follows.

If the received signal level (e.g., signal quality and signal strength) from serving cell 115a is equal to or better than the signal threshold (i.e., the first set of conditions is met), then wireless device 110 measures on one or more cells of the carriers belonging to the normal performance group (e.g., cells 115a and 115b). Otherwise, if the signal level (e.g., signal quality and/or signal strength) from serving cell 115a is worse than the signal threshold (i.e. degraded), meaning the first set of conditions is met, then wireless device 110 measures on one or more cells of the carriers belonging to a reduced performance group (e.g., cells 115c and 115d). Optionally, the measurements on cells on the carriers of the reduced performance group may all be done during each or a subset of the active time (e.g., PTWs, ON duration, etc.) of the DRX cycle.

The measurement rate on carriers within the reduced performance group may be lower than the normal set of carriers. This may also apply when these carriers are measured based on the received signal level. As long as the measurements of the candidate cells are compared with the serving cell, then the measurements may be spread out between different sets of the short DRX cycle. From a power consumption point of view, however, all carriers may be measured in one set of short DRX cycles.

For example, wireless device 110 may be configured with the first and the second measurement configurations comprising of the first set of carriers in normal performance group (e.g., cells 115a and 115b) and the second set of carriers in reduced performance group (e.g., cells 115c and 115d), respectively. Wireless device 110 may be configured with one or more long activity configuration (e.g., eDRX, or a DRX cycle length larger than a threshold). When the activity level is larger than a DRX_threshold (e.g., DRX cycle >10.24 seconds) wireless device 110 may obtain one or more criteria to determine whether to perform one or more measurements on one or more carriers of the first set of carriers and/or of the second set of carriers.

For example, the criteria may be based on the comparison of the signal level of the serving cell (e.g., RSRP and/or RSRQ measured on the serving cell) with respect to a signal threshold. As a particular example, if the RSRP and/or RSRQ and/or RS-SINR of the serving cell of the wireless device are below their respective signal thresholds, then the wireless device applies a reduced measurement procedure to measure on cells of the first set of carriers and the second set of carriers (e.g., cells 115a, 115b, 115c and 115d). Otherwise (i.e., RSRP and RSRQ and RS-SINR are above their respective signal thresholds), the wireless device applies a normal measurement procedure to measure on cells of the first set of carriers (e.g., cells 115a and 115b).

The measurements may be performed on the two sets of carriers based on the first or the second measurement procedures according to the following examples. In one example of the first measurement procedure, the wireless device performs measurements on the cells of first and second set of carriers with the same measurement rate (i.e., perform measurements on the first and second set of carriers with the same performance requirements, such as where the L1 measurement period is the same in both cases). In another example of the first measurement procedure, the wireless device performs measurements on the cells of the first set of carriers and at least a subset (P) of second set of carriers (e.g., at least one carrier in the second set) with the same measurement rate (i.e., perform measurements on the first and second set of carriers with the same performance requirements, such as where the. L1 measurement period is the same in both cases).

In an example of the second measurement procedure, the wireless device performs measurements on the cells of the first set of carriers and does not perform measurement on cells of any of the carriers in the second set. In another example of the second measurement procedure, the wireless device performs measurements only on the cells of the first set of carriers with normal measurement performance and performs measurement on cells of only a subset (Q) of second set of carriers (e.g., at least one carrier in the second set but less than the total carriers in the second set) with reduced measurement performance. The wireless device does not perform measurements on the remaining carriers within the second set. The normal performance is better than the reduced performance (e.g., L1 period is shorter in the former case with respect to the L1 period in the latter case for doing measurement on the same type of measurement, such as RSRP, cell search, etc.).

In the above examples, whether to apply the first or the second measurement procedures may depend on one or more additional parameters associated with the DRX cycle. Examples of such parameters include active duration of the DRX, inactive duration of the DRX, PTW, number of DRX cycles with in PTW, etc. For example, if the PTW is larger than a PTW threshold, then the wireless device may apply the first measurement procedure, otherwise it may apply the second measurement procedure for measurement on the cells of the first and the second set of carriers. In particular embodiments, the parameters such as DRX threshold, signal threshold, P, Q, PTW threshold, etc. may be pre-defined, determined by the wireless device autonomously, or configured at the wireless device by the network node.

Particular embodiments include methods for determining the first and second measurement configurations. The first and second measurement configurations may be pre-defined, may be determined by the wireless device autonomously (e.g., based on pre-defined rule, measurements, activity/inactivity configuration, etc.), and/or may be configured by another node (e.g., a network node).

Examples for determining the first and second measurement configurations include any combination of the following: (a) the first measurement configuration comprises at least N cells and/or carriers; (b) the second measurement configuration comprises at least M cells and/or carriers; (c) the first measurement configuration comprises at most K cells and/or carriers; (d) the second measurement configuration comprises at most L cells and/or carriers; (e) the number of carriers in the first and the second measurement configurations may relate as R1/R2, e.g., ½ may mean that the second set of carriers should be 2 times larger (twice as more carrier frequencies to measure on) than the first set; (f) a measurement configuration comprising a set of carriers/bands and/or cells to measure may be determined, for example, based on wireless device capability, measurement purpose (e.g., RRM, mobility, positioning, etc.), carrier frequency/band availability in the area, performance and/or operation targets (e.g., small cells or macro cells), etc.; or (g) carriers and/or cells that are expected to provide better performance (e.g., due to proximity to the wireless device, due to better propagation conditions, better coverage, lower interference, larger bandwidth, less strict requirements that impact performance (e.g., putting restrictions on transmission configuration) are included in a first set, while other carriers and/or cells are included in a second set.

Particular embodiments include methods for determining the first and the second sets of time resources. For example, the first and the second sets of time resources may be pre-defined, may be determined by the wireless device autonomously (e.g., based on pre-defined rule, measurements, activity/inactivity configuration, etc.), and/or may be configured by another node (e.g., a network node, a serving eNodeB, etc.).

In another example, the first and the second sets of time resources may be associated with the first and second set of conditions, respectively. The time resources that meet the first set of conditions comprise the first set of time resources, and the time resources that meet the second set of conditions comprise the second set of time resources.

The conditions may be pre-defined, determined autonomously by the wireless device, or configurable by another node (e.g., a network node, a serving eNodeB, etc.). One or more thresholds may be signaled by the network node via unicast, multicast or broadcast signaling.

Example conditions may include one of more of the following: (a) handover; (b) coverage (e.g., when in good coverage, the first set of measurements is performed according to the measurement configuration in the first set of time resources, but when the coverage is degraded the second set of measurements is performed according to the second measurement configuration in the second set of time resources, while the first set of measurements is stopped (in one example) or in addition to the first set of measurements (in another example) so that the first and the second set of time resources comprise the same time interval); (c) performance requirement, target performance, acceptable performance degradation, etc. (e.g., when a lower performance target applies then the first set of measurements is performed, otherwise the second set of measurements is performed); (d) positioning (e.g., the first set of measurements is performed always in a certain logical or geographical location or area); and (e) signals compared to thresholds.

Particular embodiments include methods in a network node. In an example method the network node sends (via broadcast or unicast) a message or an indication to one or more wireless devices comprising implicitly or explicitly at least one of: (a) a first and/or a second measurement configuration for performing the first and/or the second sets of measurements when the wireless device is configured with a long inactivity configuration; (b) a first and/or second sets of time resources for performing the first and/or the second sets of measurements when the wireless device is configured with a long inactivity configuration; (b) a first and/or second sets of measurements for performing when the wireless device is configured with a long inactivity configuration; and (d) first and/or second priority associated with the first and second sets of measurements or with the first and second measurement configurations or with the first and second sets of time resources.

The network node may receive a first and/or a second set of measurements from the wireless device, associated with the first and the second measurement configuration, respectively. The network node may use the received measurements for one or more operational tasks (e.g., for RRM or sending to another node).

In addition to the wireless device embodiments described above, particular embodiments may include the following example steps. For a wireless device in good coverage, during a set of short DRX cycles (Paging Transmit Window or PTW), only Normal set is measured. When a wireless device enters bad coverage (based on signaled thresholds or wireless device hardcoded thresholds), the wireless device measures on all carriers (normal and reduced set) in every set of short DRX cycles (PTW).

In particular embodiments, a wireless device in bad coverage measures the carriers in the reduced set with a lower rate, meaning that a carrier is measured with several measurement samples and averaged during one set of short DRX cycles (PTW), but it is not measured every PTW. (It does not matter if all cells in the reduced set are measured in the same DRX cycle or if they are spread out with a subset of carriers in every PTW.) In particular embodiments, a wireless device in good coverage measures the carriers in the reduced set with a lower rate, meaning that each carrier is only measured in a subset of the set of short DRX cycles, (PTW). The rate is low to achieve low power consumption while also supporting some level of mobility. The normal and reduced set may be set by the IncMon procedure and/or by a rule based procedure. Particular embodiments may include several sets of carriers with different priorities with different thresholds for starting measurements.

In particular embodiments, the decision whether the wireless device needs to measure on a reduced set is determined in the wireless device based on thresholds or other rules. Particular embodiments may have thresholds on CPICH_Ec/Io in UTRA and RSRP and/or RSRQ in LTE, etc. These thresholds may be set in the wireless device based on a margin to the coverage limit or on a specified threshold. The thresholds may also be set by signaling from the network.

Particular embodiments may include rules that include a trend of the measurements, allowing a bad coverage that is stable without extending the number of measurements, or just increasing it slightly. For example, a wireless device supporting a water meter in the basement may still limit the measurements. For these stable scenarios, the normal set may be limited to the serving carrier to limit the measurement activities. In particular embodiments, several sets of reduced set may be advantageous. Example methods are illustrated in FIGS. 5 and 6.

Figure 5:
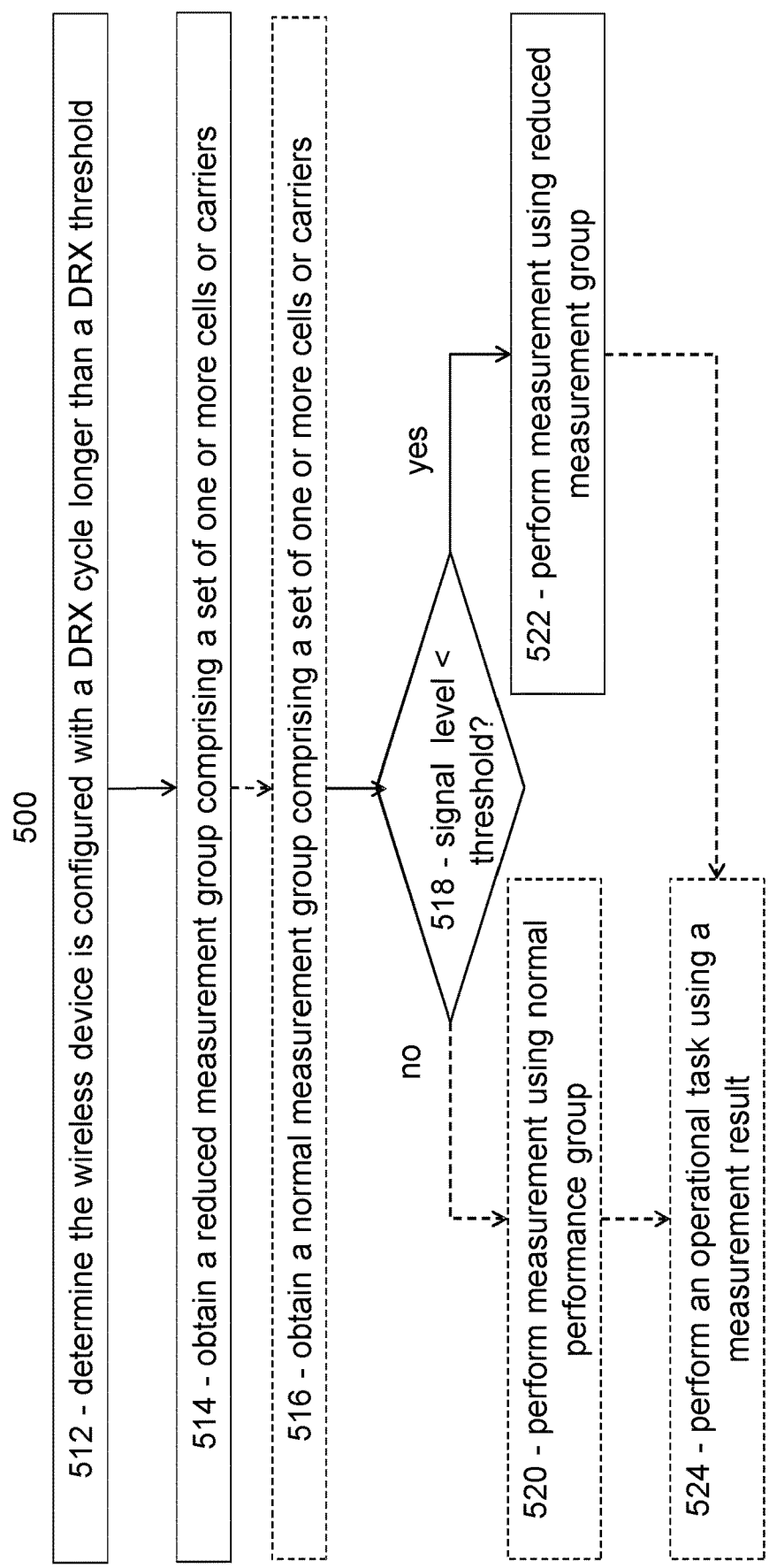
FIG. 5 is a flowchart of an example method of measuring multiple carriers in a wireless device capable of operating in discontinuous activity mode, according to some embodiments.
Figure 6:
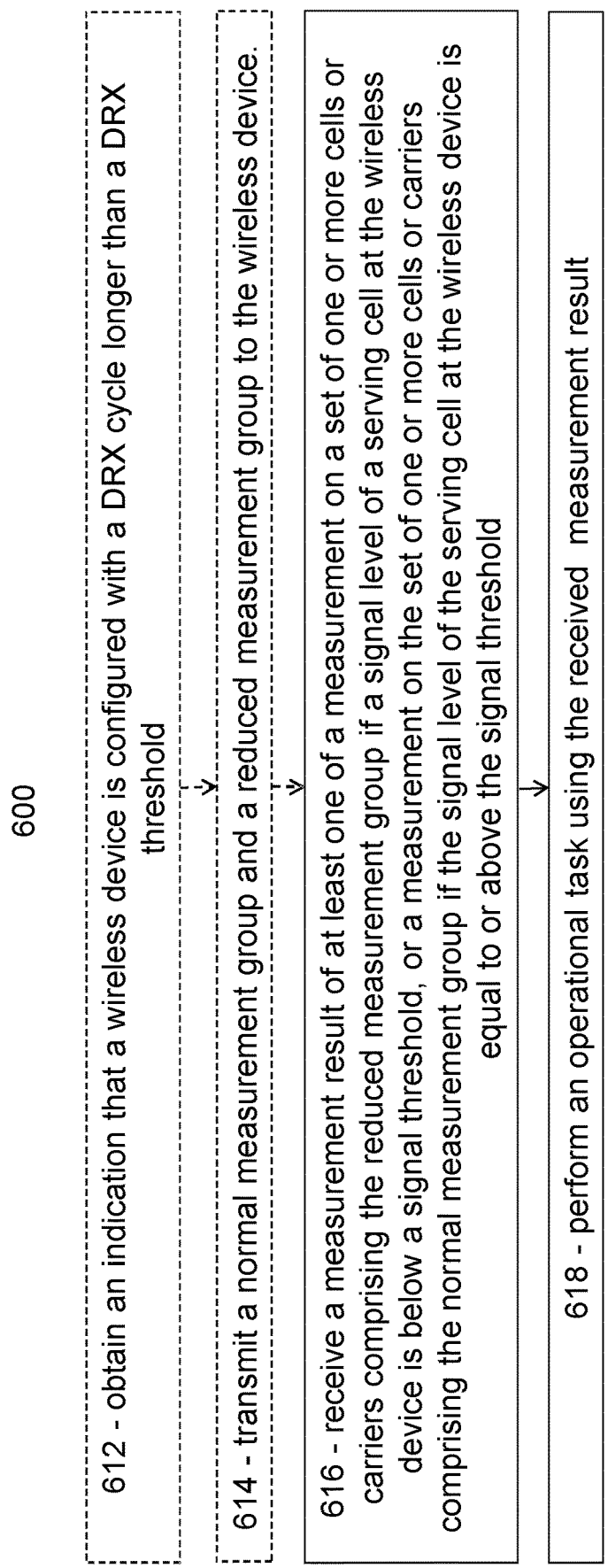
FIG. 6 is a flowchart of an example method of measuring multiple carriers in a network node capable of operating in discontinuous activity mode, according to some embodiments.

FIG. 5 is a flowchart of an example method of measuring multiple carriers in a wireless device capable of operating in discontinuous activity mode, according to some embodiments. In particular embodiments, one or more steps of the method may be performed by components of network 100 described with reference to FIG. 4.

The method begins at step 512, where a wireless device determines that the wireless device is configured with a DRX cycle longer than a DRX threshold. For example, wireless device 110 may determine it is configured with a DRX cycle longer than 20.48 seconds. In other embodiments, the DRX threshold may be based on any suitable DRX characteristic, such as those described above with respect to FIG. 4, such as activity cycle, DRX cycle, eDRX cycle, on-duration time, ratio of on-duration time to off-duration time, ability to combine samples from different activity cycles, number of downlink or uplink subframes per activity period, etc.

At step 514, the wireless device obtains a reduced measurement group comprising a set of one or more cells or carriers to be measured. For example, wireless device 110 may obtain, from network node 120a, a reduced measurement group comprising cells 115c and 115d.

At step 516, the wireless device obtains a normal measurement group comprising a set of one or more cells or carriers to be measured. For example, wireless device 110 may obtain, from network node 120a, a normal measurement group comprising cells 115a and 115b.

In particular embodiments, wireless device 110 may obtain the reduced and/or normal measurement group by receiving a measurement group configuration from a network node, such as network node 120, by obtaining a pre-defined configuration, or determining autonomously (e.g., based on pre-defined rule, measurements, activity/inactivity configuration, etc.).

In particular embodiments, one of steps 514 and 516 may be optional. For example, wireless device 110 may determine a known set of cells comprises cells 115a, 115b, 115c and 115d. Wireless device 110 may receive, from network node 120, a reduced performance group comprising cells 115c and 115d. Based on the a set of one or more cells or carriers to be measured in the reduced performance group and the known set of cells, wireless device 110 may determine a normal performance group. In this example, the normal performance group may include cells 115a and 115b.

In particular embodiments a measurement group may include configuration information including, for example, any one or more of: (1) the number of carrier frequencies; (2) one or more of certain carrier frequencies; (3) the number of frequency bands; (4) one or more of certain frequency bands; (5) one or more of frequency resources; (6) one or more bandwidth (system bandwidth, measurement bandwidth, etc.) configurations; (7) number of cells or cell types (e.g., small cells, macro cells, etc.); and (8) one or more specific cells or cell types.

The set of one or more cells or carriers in the normal and reduced measurement groups may be determined according to any of the embodiments described above with respect to FIG. 4. For example, the normal measurement group may include less cells or carriers than the reduced measurement group, the cells or carriers may overlap between measurement groups, the measurement groups may include the same cells or carriers, but measure at different rates (e.g., the normal measurement group is measured at a higher rate than the reduced performance group).

In particular embodiments, as described with respect to FIG. 4, the wireless device may obtain a normal set of one or more time resources and a normal set of one or more measurements to use with the first measurement group, and may obtain a reduced set of one or more time resources and a reduced set of one or more measurements to use with the reduced measurement group.

At step 518, the wireless device compares a signal level of the serving cell at the wireless device with a signal threshold. For example, wireless device 110 may perform an RSRP and/or RSRQ measurement on cell 115a and compare the measured value(s) with a threshold (e.g., Srxlev and/or Squal greater or less than 3 db). If the signal level is greater than or equal to the signal threshold, then the method continues to step 520.

At step 520, the wireless device performs a measurement on the set of one or more cells or carriers of the normal measurement group. For example, wireless device 110 may perform a measurement on cells 115a and/or 115b. Wireless device 110 may perform any of the measurements described above with respect to FIG. 4.

Returning to step 518, if the signal level is greater than or equal to the signal threshold, then the method continues to step 522. At step 522, the wireless device performs a measurement on the set of one or more cells or carriers of the reduced measurement group. For example, wireless device 110 may perform a measurement on cells 115c and/or 115d. Wireless device 110 may perform any of the measurements described above with respect to FIG. 4.

At step 524, the wireless device performs an operational task using a measurement result of at least one of steps 520 and 522. For example, wireless device 110 may perform cell reselection.

Modifications, additions, or omissions may be made to the method of FIG. 5. Additionally, one or more steps in the method of FIG. 5 may be performed in parallel or in any suitable order. The method may be repeated as necessary over time.

FIG. 6 is a flowchart of an example method of measuring multiple carriers in a network node capable of operating in discontinuous activity mode, according to some embodiments. In particular embodiments, one or more steps of the method may be performed by components of network 100 described with reference to FIG. 4.

The method begins at step 612, where a network node optionally obtains an indication that a wireless device is configured with a DRX cycle longer than a DRX threshold. For example, network node 120a may obtain an indication that wireless device 110 is configured with a DRX cycle longer than 20.48 seconds. In particular embodiments, the network node may obtain an indication that a wireless device is configured with a DRX cycle longer than a DRX threshold based on a type of wireless device (e.g., the wireless device is an MTC device).

At step 614, the network node transmits a normal measurement group and/or a reduced measurement group to the wireless device. For example, network node 120 sends a reduced measurement group comprising cells 115c and 115d to wireless device 110. In particular embodiments, the measurement groups may comprise any of the measurement groups in the embodiments described with respect to FIGS. 4 and 5.

At step 616, the network node receives a measurement result from the wireless device. If a signal level of a serving cell at the wireless device is below a signal threshold, then the received measurement is a measurement according to the reduced measurement group, otherwise the received measurement is a measurement according to the normal measurement group. For example, network node 120 may receive a measurement result from wireless device 110. Wireless device 110 may perform the measurement according to the steps of method 500 described with respect to FIG. 5.

At step 618, the network node performs an operational task using the received measurement result. For example, network node 120 may use the received measurement result for radio resource management (RRM) or for sending to another radio node.

Modifications, additions, or omissions may be made to the method of FIG. 6. Additionally, one or more steps in the method of FIG. 6 may be performed in parallel or in any suitable order. The method may be repeated as necessary over time.

Figure 7B:
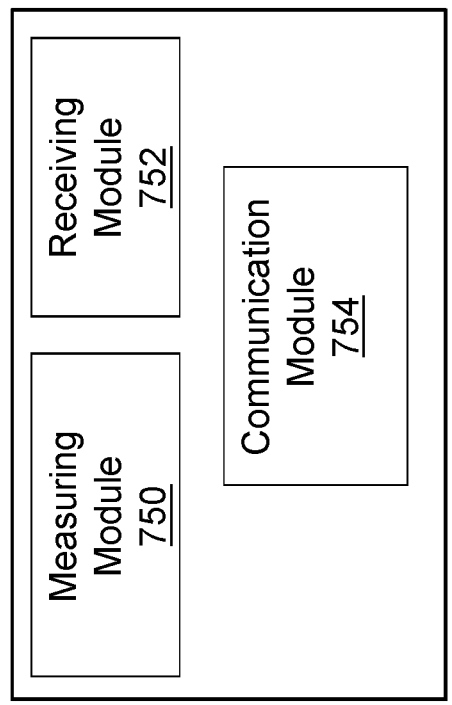
FIG. 7B is a block diagram illustrating example components of a wireless device.
Figure 7A:
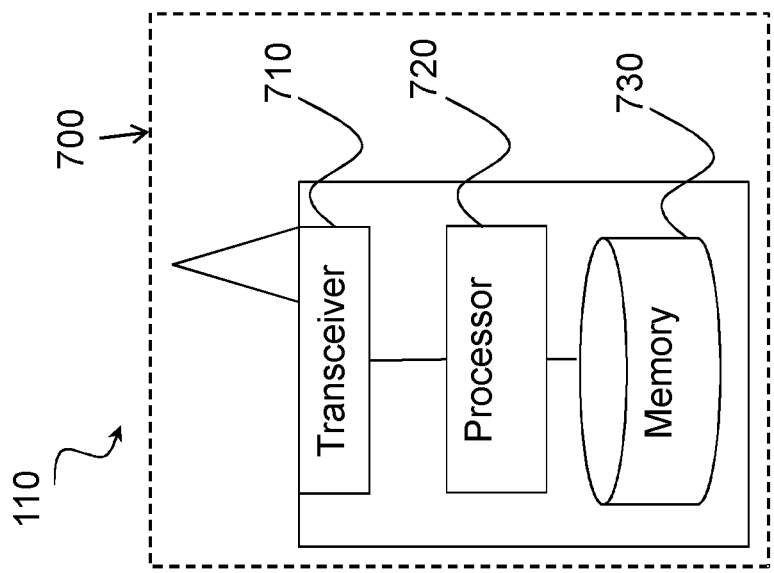
FIG. 7A is a block diagram illustrating an example embodiment of a wireless device.

FIG. 7A is a block diagram illustrating an example embodiment of a wireless device. The wireless device is an example of the wireless device 110 illustrated in FIG. 4.

The wireless device is capable of determining that the wireless device is configured with a DRX cycle longer than a DRX threshold. The wireless device is operable to obtain one or more of a reduced measurement group and a normal measurement group. Each measurement group comprises a set of one or more cells or carriers to be measured. The wireless device is also operable to compare a signal level of the serving cell at the wireless device with a signal threshold. When the signal level of the serving cell at the wireless device is below the signal threshold, the wireless device is operable to perform a measurement on the set of one or more cells or carriers of the reduced measurement group. When the signal level of the serving cell at the wireless device is equal to or above the signal threshold, the wireless device is operable to perform a measurement on the set of one or more cells or carriers of the normal measurement group.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 700. Processing circuitry 700 includes transceiver 710, processor 720, and memory 730. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 720 in communication with transceiver 710 may perform measurements on signals from multiple cells or on multiple carriers.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

FIG. 7B is a block diagram illustrating example components of a wireless device 110. The components may include measuring module 750, receiving module 752, and communication module 754.

Measuring module 750 may perform the measuring functions of wireless device 110. For example, measuring module 750 may determine that wireless device 110 is configured with a DRX cycle longer than a DRX threshold. Measuring module 750 may compare a signal level of the serving cell at the wireless device with a signal threshold; and when the signal level of the serving cell at the wireless device is below the signal threshold, perform a measurement on the set of one or more cells or carriers of the reduced measurement group, otherwise perform a measurement on the set of one or more cells or carriers of the normal measurement group. In certain embodiments, measuring module 750 may include or be included in processor 720. Measuring module 750 may include circuitry configured to receive radio signals. In particular embodiments, measuring module 750 may communicate with receiving module 752 and communication module 754.

Receiving module 752 may perform the receiving functions of wireless device 110. For example, receiving module 752 may obtain a reduced or normal measurement group comprising a set of one or more cells or carriers to be measured. Receiving module 752 may include circuitry configured to receive radio signals. In certain embodiments, receiving module 752 may include or be included in processor 720. In particular embodiments, receiving module 952 may communicate with measuring module 750 and communication module 754.

Communication module 754 may perform the communicating functions of wireless device 110. For example, communication module 754 may perform operational tasks (handover, cell selection, cell reselection, etc.) of wireless device 110. In certain embodiments, communication module 754 may include or be included in processor 720. In particular embodiments, communication module 754 may communicate with measuring module 750 and receiving module 752.

Figure 8B:
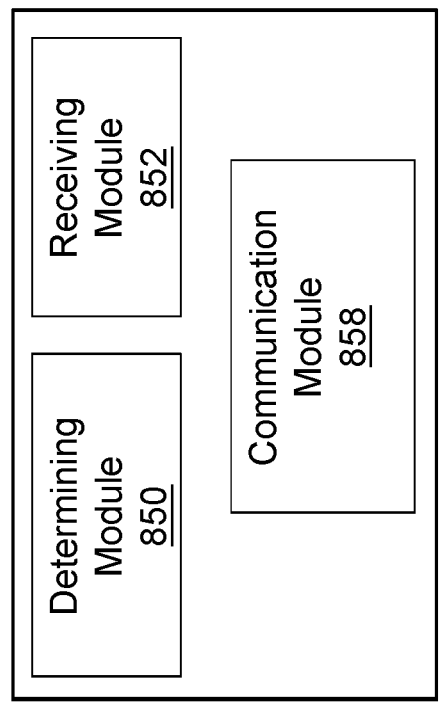
FIG. 8B is a block diagram illustrating example components of a network node.
Figure 8A:
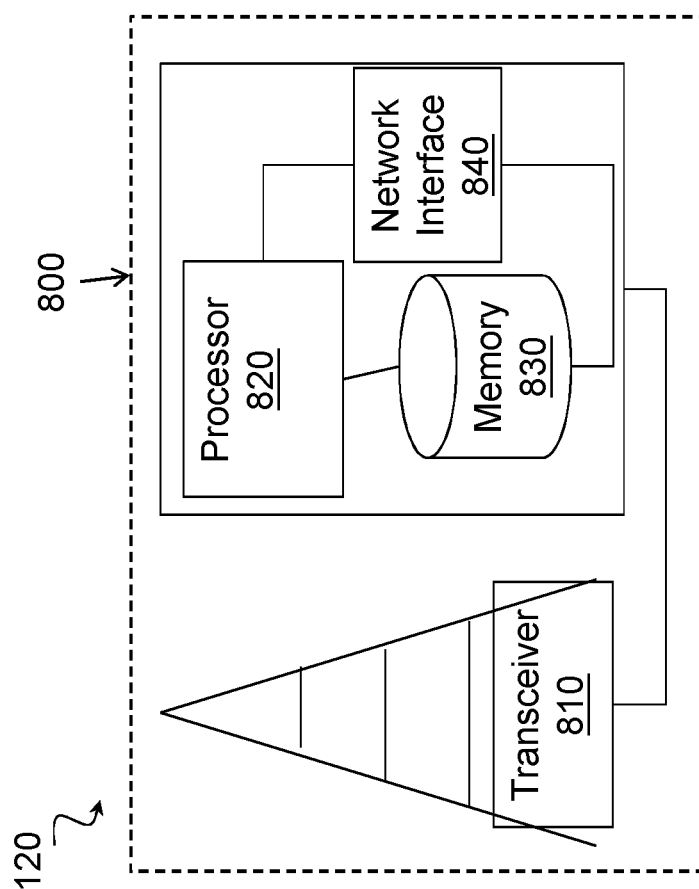
FIG. 8A is a block diagram illustrating an example embodiment of a network node.

FIG. 8A is a block diagram illustrating an example embodiment of a network node. The network node is an example of the network node 120 illustrated in FIG. 4. The network node is capable of obtaining an indication that a wireless device is configured with a DRX cycle longer than a DRX threshold. The network node is operable to transmit a normal or reduced measurement configuration to a wireless device and to receive a measurement from the wireless device to use for an operational task.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes processing circuitry 800. Processing circuitry 800 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7A above.

In some embodiments, network interface 840 is communicatively coupled to processor 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 transmits signals to wireless device 110 and receives measurement results from wireless device 110.

Other embodiments of network node 120 include additional components (beyond those shown in FIG. 8A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 8B is a block diagram illustrating example components of a network node 120. The components may include measuring module 850, receiving module 852, and communication module 854.

Measuring module 850 may perform the measuring functions of network node 120. For example, measuring module 850 may obtain an indication that wireless device 110 is configured with a DRX cycle longer than a DRX threshold. Measuring module 850 may transmit a normal and/or reduced measurement group to wireless device 110. In certain embodiments, measuring module 850 may include or be included in processor 820. Measuring module 850 may include circuitry configured to transmit radio signals. In particular embodiments, measuring module 850 may communicate with receiving module 852 and communication module 854.

Receiving module 852 may perform the receiving functions of network node 120. For example, receiving module 852 may receive a measurement result from wireless device 110. In certain embodiments, receiving module 852 may include or be included in processor 820. In particular embodiments, receiving module 852 may communicate with measuring module 850 and communication module 854.

Communication module 854 may perform the communicating functions of network node 120. For example, communication module 854 may perform operational tasks (RRM, etc.) of network node 120. In certain embodiments, communication module 854 may include or be included in processor 820. In particular embodiments, communication module 854 may communicate with measuring module 850 and receiving module 852.

Some embodiments of the disclosure may provide one or more technical advantages. As an example, in some embodiments, the methods and apparatus disclosed herein may facilitate low power consumption by a wireless device by limiting measurement activity. Mobility performance of a wireless device may be improved by measuring on the highest prioritized carriers, while measurements on all other carriers are still supported when needed. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP 3rd Generation Partnership Project
BS Base Station
CDM Code Division Multiplexing
CDMA2000 Code division multiple access 2000
CID Cell ID (positioning method)
CPE-RS Common Phase Error Reference Signal
CRS Cell-Specific Reference Signal
DM-RS Demodulation Reference Signal
DRX Discontinuous Reception
eDRX enhanced DRX or extended DRX
eNB Enhanced Node-B
ePDCCH Enhance Physical Downlink Control Channel
FDD Frequency Division Duplex
FDM Frequency Division Multiplexing
GSM Global System for Mobile communication
HSPA High Speed Packet Access
LTE Long Term Evolution
MIMO Multi-Input Multi-Output
MU-MIMO Multi-User MIMO
OCC Orthogonal Cover Code
OFDM Orthogonal Frequency-Division Multiplexing
PA Power Amplifier
PBCH Physical Broadcast Channel
PCFICH Physical Control Format Indicator Channel
PDCCH Physical Downlink Control Channel
PDCH Physical Data Channel
PDSCH Physical Downlink Shared Channel
PSS Primary Synchronization Signal
RAT Radio Access Technology
RS Reference Signal
RF Radio Frequency
RRC Radio Resource Control
RRM Radio Resource Management
RSRP Reference Signal Received Power
RSRQ Reference Signal Received Quality
RSSI Received Signal Strength Indicator
SNR Signal-to-Noise Ratio
SINR Signal-to-Interference plus Noise Ratio
SRS Sounding Reference Signal
SSS Secondary Synchronization Signal
TDD Time Division Duplexing
UE User Equipment
UMTS Universal Mobile Telecommunications System
UTRA Universal Terrestrial Radio Access
WiMAX Worldwide Interoperability for Microwave Access The following examples are examples of how certain aspects of the embodiments described herein could be implemented within the framework of a specific communication standard. In particular, the following examples provide a non-limiting example of how the embodiments described herein could be implemented within the framework of a 3GPP RAN standard. The changes described by the examples are merely intended to illustrate how certain aspects of the embodiments could be implemented in a particular standard. However, the embodiments could also be implemented in other suitable manners, both in the 3GPP Specification and in other specifications or standards.

Figure 3:
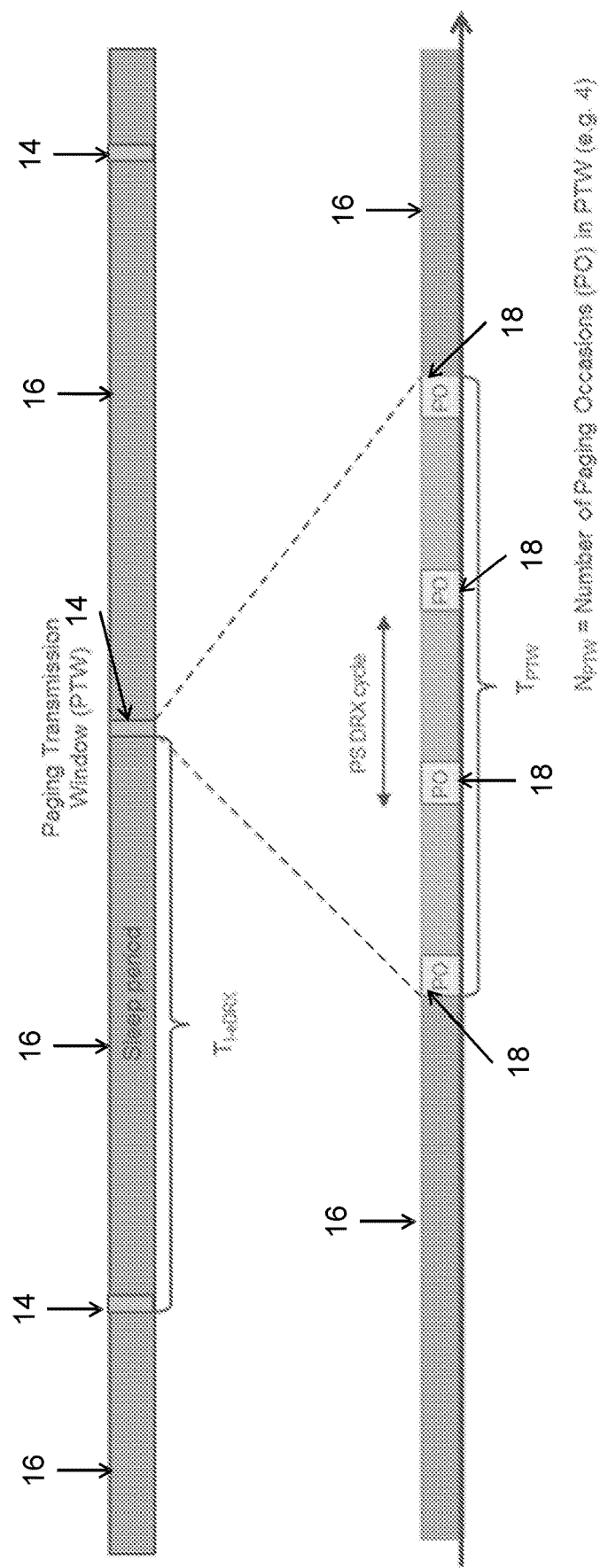
FIG. 3 illustrates an example eDRX in UTRA.

Extended DRX for UTRA may include power saving enhancements for UMTS. In eDRX, the DRX cycle is much longer than the legacy PS DRX cycles. The eDRX cycle consists of a long sleep period, $T_{i\text{-}eDRX}$. The UE wakes up to a Paging Transmission Window where there are N_PTW paging occasions with the legacy PS DRX cycle. An example of eDRX scheduling is illustrated in FIG. 3. Thus, improved cell reselection performance requirements may account for eDRX, Particular examples include measurements during eDRX cycles. The sleep period (i.e., $T_{i\text{-}eDRX}$) can be rather long, between 10 s and up to 1 hour. The following are example DRX cycles:

| | |
|---|---|
| 0010 | 10.24 seconds |
| 0011 | 20.48 seconds |
| 0100 | 40.96 seconds |
| 0101 | 1.37 minutes |
| 0110 | 2.73 minutes |
| 0111 | 5.46 minutes |
| 1000 | 10.92 minutes |
| 1001 | 21.85 minutes |
| 1010 | 43.69 minutes |

For the short eDRX cycles, 10.24 and 20.48 seconds, it can be feasible to use the same kind of requirements as today where the filtering can be done with samples from different eDRX cycles. For longer eDRX cycles, the cell reselection may be degraded when measurement samples from the previous eDRX cycle are used in the averaging together with samples from the current eDRX cycle.

Different solutions may apply for short and long eDRX cycles. For the longer eDRX cycles, all cells that need to be considered in the cell reselection evaluation at a certain eDRX cycle should be measured with several samples at the eDRX cycle so that the averaging can be performed before evaluation is done. The measurements from previous eDRX cycles are not considered for this evaluation. At least for long eDRX cycles, the UE may perform several measurement samples during the PTW of the serving and other cells that will be evaluated for cell reselection for averaging.

For the detection of new cells when in eDRX mode with long eDRX cycle, the UE may search for new cells during a PTW and be able to find new cells stronger than the serving cell on carriers that it measures. For the long DRX cycles (longer than X seconds), the UE is able to detect new cells stronger than the serving cell in connection to the PTW DRX cycles when the UE is active during the eDRX cycle.

In some examples, eDRX may be used in conjunction with IncMon. In legacy idle mode with DRX cycles up to 5.12 s, the IncMon feature is used to support more carriers without causing an excessive delay.

With eDRX and very long eDRX cycles, to increase the measurement delay further for the carriers with reduced performance requirements in the IncMon requirements does not make much sense. It will be too long between the cell reselection evaluations to these cells. Measuring all carriers in both the normal performance group and the reduced performance group every eDRX cycle may defeat the power saving goals of eDRX.

Reduced performance groups are available when needed, but the mobility in normal case will be between the cells in the normal performance group. Therefore, for eDRX as long as the performance is good and the mobility between the cells in the normal performance group is working, the UE does not have to measure the cells in the reduced performance group. The measurements on the carriers in the reduced performance group need to be switched on when the received signal quality (CPICH_Ec/Io) is below a threshold that is close to the limit when the UE is out of synchronization. This threshold can either be signaled to the UE together with the list of carriers to measure, or it can be an internal threshold in the UE specified in a specification document.

Accordingly, when IncMon is used, the carriers in the reduced performance group are measured when the quality of the serving cell is below a threshold. Otherwise the UE is not required to measure on the carriers in the reduced performance group. The threshold may be signaled or it may be specified in a specification, such as 25.133. The threshold may be defined as an offset to a suitable cell threshold or as an absolute threshold in CPICH_Ec/No or RSCP.

The issue with too long cycles, which effects spreading a measurement over multiple DRX cycles, is less pronounced with eDRX in RRC_CONNECTED compared to RRC_IDLE. Thus, the examples below include examples for IncMon in RRC_CONNECTED state, followed by examples for RRC_IDLE state.

For example, in RRC-CONNECTED state the measurement time may be extended to account for the eDRX cycle length while the UE is monitoring all the carrier frequencies. As another example, the UE may not monitor all the carrier frequencies all the time, but only when it is needed, e.g., when the serving cell quality or strength degrades below an acceptable level, which can save UE resources while most of the time still maintaining the measurement time comparable to that in non-DRX configuration. The latter example may be more resource efficient than the former example.

Particular examples may include eDRX in conjunction with Minimization of Drive Tests (MDT). In current specifications, the same requirements apply for MDT with and without DRX. This is also true for eDRX. Accordingly, a specification may explicitly note that the same requirements apply with extended DRX to ensure MDT performance with eDRX.

Particular examples may include eDRX in conjunction with positioning measurements. Positioning may be used for emergency, therefore proper requirements are needed to guarantee the positioning measurement performance. Current RSTD measurement requirements apply for DRX and non-DRX. The same RSTD requirements apply with non-DRX, DRX, and extended DRX. Current E-CID measurement requirements depend on DRX cycle length. E-CID measurement time requirements may be extended to account for the eDRX cycle length.

Some examples may include measurement requirements for transitions to and from eDRX. Some measurement requirements may be different for eDRX and DRX. At the same time, with long DRX cycles, the measurements may take long time and may be resource-demanding. Therefore, the UE behavior may be described at transitions to and from eDRX, to avoid or minimize wasting UE resources and ensure that whenever possible the UE completes and reports the measurements while meeting certain requirements. Accordingly, eDRX requirements may be specified for transitions to and from eDRX, e.g., when a UE is configured with eDRX while performing a measurement which has started without eDRX.

Requirements for eDRX may be specified for intra-frequency, inter-frequency, and inter-RAT measurements. Current requirements typically specify the time in terms of the number of DRX cycles, which is decreasing while the cycle length is decreasing. In one example, eDRX requirements may specify the number of cycles which do not exceed the smallest number of cycles (typically associated with the longest DRX) in the corresponding current DRX requirements. Particular examples, may add an additional row to a table in an existing requirements. Table 1 is an example for FDD intra-frequency cells.

TABLE 1

| DRX cycle length(s) | $T_{measure\_intra}$ (s) (DRX cycles) |
|---|---|
| ≤0.04 | 0.2 (Note1) |
| 0.04 < DRX-cycle ≤ 2.56 | Note2 (5) |
| 5.12 ≤ eDRX-cycle ≤ 10.24 | Note2 (5) |

Note1
Number of DRX cycle depends upon the DRX cycle in use
Note2
Time depends upon the DRX cycle in use Other examples may include eDRX in RRC_IDLE state. For example, eDRX may be used in conjunction with IncMon. With long eDRX cycles, increasing the measurement delay further for the carriers with reduced performance in the IncMon requirements will result in that the time between the cell reselection evaluations to these cells may become too long. Furthermore, the benefit in power saving with eDRX may disappear if a UE is required to measure all carriers in both the normal performance group and the reduced performance group every DRX cycle. As a compromise, it may be more practical if a UE normally measures cells within the normal performance group, while it may measure cells from the reduced performance group on the need basis, e.g., to maintain the mobility performance when the serving cell strength or quality degrades below an acceptable level.

One example is to specify eDRX requirements for IncMon in RRC_IDLE. For IncMon with long eDRX cycles, the UE may normally not measure cells from the reduced performance group, unless it is needed, e.g., unless the serving cell strength or quality degrades below an acceptable level.

In current specifications, the same requirements apply for MDT with and without DRX. This may also be used with eDRX. A specification may explicitly note that the same requirements apply with extended DRX to ensure the MDT performance with eDRX. The specification may apply the same requirements for non-DRX, DRX, and extended DRX.

In some examples, eDRX is used with TDD. With eDRX, not all TDD configurations may meet the requirements. This is because of the insufficient number of signal instances available for the measurements due to short activity times and long inactivity periods, which makes accumulating samples over multiple occasions particularly challenging. The specification may include eDRX requirements for FDD and all suitable TDD configurations.

Some measurement requirements may be different for eDRX and DRX. At the same time, with long DRX cycles, the measurements may take a long time and may be resource-demanding. Therefore, the UE behavior may be described at transitions to and from eDRX to avoid or minimize wasting UE resources and ensure that whenever possible the UE completes and reports the measurements while meeting certain requirements. The specification may include eDRX requirements also for transitions to and from eDRX, e.g., when a UE is configured with eDRX while performing a measurement which has started without eDRX.

Some examples include eDRX requirements for intra-frequency measurements. Existing intra-frequency measurements are shown in Table 2.

TABLE 2

| DRX cycle length[s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_intra}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

New intra-frequency eDRX requirements include: $T_{measure,EUTRAN\_Intra}$ is 1 DRX cycle for all DRX cycle lengths; and $T_{evaluate,E-UTRAN\_intra}$ is 3 DRX cycles for all DRX cycle lengths, which may be limited to one eDRX cycle.

Some examples include eDRX requirements for inter-frequency measurements. In the existing inter-frequency requirements, the UE shall be able to evaluate whether a newly detectable inter-frequency cell in normal performance group meets the reselection criteria defined in TS 36.304 within $K_{carrier,normal}*T_{detect,EUTRAN\_Inter}$, and able to evaluate whether a newly detectable inter-frequency cell in reduced performance group meets the reselection criteria defined in TS36.304 within $6*K_{carrier,reduced}*T_{detect,EUTRAN\_Inter}$. The currently specified $T_{detect,EUTRAN\_Inter}$, $T_{measure,EUTRAN\_Inter}$ and $T_{evaluate,E-UTRAN\_Inter}$ are as shown in Table 3.

TABLE 3

| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E-UTRAN\_Inter}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

New inter-frequency eDRX requirements include: $T_{measure,EUTRAN\_Inter}$ is 1 DRX cycle for all DRX cycle lengths; and $T_{evaluate,E-UTRAN\_inter}$ is 3 DRX cycles for all DRX cycle lengths, which may be limited to one eDRX cycle Some examples include eDRX requirements for inter-RAT measurements. The currently specified inter-RAT requirements are as shown in Tables 4-8.

TABLE 4

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |    | 5.12 (8) | 15.36 (24) |
| 1.28 |    | 6.4 (5) | 19.2 (15) |
| 2.56 | 60 | 7.68 (3) | 23.04 (9) |

TABLE 5

| DRX cycle length [s] | $T_{detectUTRA\_TDD}$ [s] | $T_{measureUTRA\_TDD}$ [s] (number of DRX cycles) | $T_{evaluateUTRA\_TDD}$ [s] (number of DRX cycles) |
|---|---|---|---|
| 0.32 | 30 | 5.12 (16) | 15.36 (48) |
| 0.64 |    | 5.12 (8) | 15.36 (24) |
| 1.28 |    | 6.4 (5) | 19.2 (15) |
| 2.56 | 60 | 7.68 (3) | 23.04 (9) |

TABLE 6

| DRX cycle length [s] | $T_{measure,GSM}$ [s] (number of DRX cycles) |
|---|---|
| 0.32 | 5.12 (16) |
| 0.64 | 5.12 (8) |
| 1.28 | 6.4 (5) |
| 2.56 | 7.68 (3) |

TABLE 7

| DRX cycle length [s] | $T_{measureHRPD}$ [s] (number of DRX cycles) | $T_{evaluateHRPD}$ [s] (number of DRX cycles) |
|---|---|---|
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

TABLE 8

| DRX cycle length [s] | $T_{measureCDMA2000\_1X}$ [s] (number of DRX cycles) | $T_{evaluateCDMA2000\_1X}$ [s] (number of DRX cycles) |
|---|---|---|
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

New inter-RAT eDRX requirements include: $T_{measure,*}$ is 3 DRX cycle for all DRX cycle lengths, which may be limited to one eDRX cycle; and $T_{evaluate,*}$ (for the RATs it exists already) is 9 DRX cycles for all DRX cycle lengths, which may be limited to one eDRX cycle.

A 3GPP specification with e DRX in idle mode and cell reselection requirements in eDRX may include the following examples.

Introduction

The cell reselection procedure allows the UE to select a more suitable cell and camp on it.

When the UE is in either Camped Normally state or Camped on Any Cell state on a cell, the UE shall attempt to detect, synchronise, and monitor intra-frequency, inter-frequency and inter-RAT cells indicated by the serving cell. For intra-frequency and inter-frequency cells the serving cell may not provide explicit neighbour list but carrier frequency information and bandwidth information only. UE measurement activity is also controlled by measurement rules defined in TS36.304, allowing the UE to limit its measurement activity.

Requirements

The UE shall search every layer of higher priority at least every $T_{higher\_priority\_search}=(60*N_{layers})$ seconds when the UE is not configured with eDRX_IDLE cycle, and at least every $T_{higher\_priority\_search}=\text{MAX}(60*N_{layers},$ one eDRX_IDLE cycle) when UE is configured with eDRX_IDLE cycle, where $N_{layers}$ is the total number of configured higher priority E-UTRA, UTRA FDD, UTRA TDD, CDMA2000 1×0 and HRPD carrier frequencies and is additionally increased by one if one or more groups of GSM frequencies is configured as a higher priority.

In the requirements of Section 4.2.2 for the UE capable of CA, the applicable exceptions for side conditions are specified in Annex B, Section B.4.2.

For a UE which supports increased carrier monitoring E-UTRA or increased carrier monitoring UTRA, the reselection performance for different carriers may be configured by higher layers to be either normal or reduced. The following definitions are used in the requirements:

$K_{carrier}$: Total number of interfrequency carriers in the neighbour cell list $K_{carrier,normal}=K_{carrier}-K_{carrier,reduced}$: Number of interfrequency carriers to be monitored in the normal performance group $K_{carrier,reduced}$: Number of interfrequency carriers to be monitored in the reduced performance group $N_{UTRA\_carrier}$: Total number of configured UTRA FDD carriers in the neighbour cell list $N_{UTRA\_carrier,normal}=N_{UTRA\_carrier}-N_{UTRA\_carrier,reduced}$: Number of UTRA FDD carriers to be monitored in the normal performance group $N_{UTRA\_carrier,reduced}$: Number of UTRA FDD carriers to be monitored in the reduced performance group $N_{UTRA\_carrier\_TDD}$: Total number of configured UTRA TDD carriers in the neighbour cell list $N_{UTRA\_carrier\_TDD,normal}=N_{UTRA\_carrier\_TDD}-N_{UTRA\_carrier\_TDD,reduced}$: Number of UTRA TDD carriers to be monitored in the normal performance group $N_{UTRA\_carrier\_TDD,reduced}$: Number of UTRA TDD carriers to be monitored in the reduced performance group The minimum performance requirements for a UE which supports Increased UE carrier monitoring E-UTRA [2, 31] are calculated as defined in section 4.2.2.4 provided that $K_{carrier,normal} \leq 3$ and the minimum performance requirements for a UE which supports Increased UE carrier monitoring UTRA [2, 31] are calculated as defined in section 4.2.2.5 provided that $N_{UTRA\_carrier\_normal} \leq 3$ and $N_{UTRA\_carrier\_TDD,normal} \leq 3$. In case the limits for the number of normal performance carriers is exceeded considering the broadcast neighbour cell list and the bands supported by the UE, the UE which supports Increased UE carrier monitoring E-UTRA shall measure at least 3 interfrequency carriers with normal performance and the UE which supports Increased UE carrier monitoring UTRA shall measure at least 3 UTRA carriers with normal performance. Additionally, reduced performance requirements shall be met for carriers for which the Reduced measurement performance IE is indicated, up to the UE measurement capability in section 4.2.2.9a. The minimum performance requirements for a UE which does not support Increased UE carrier monitoring E-UTRA [2,31] are calculated assuming all E-UTRA carriers required to be monitored for such UE, are having normal performance and are in normal performance group, i.e. $K_{carrier,normal}=K_{carrier}$ and $K_{carrier,reduced}=0$. The minimum performance requirements for a UE which does not support Increased UE carrier monitoring UTRA [2,31] are calculated assuming all UTRA carriers required to be monitored for such UE, are having normal performance and are in normal performance group, i.e. $N_{UTRA\_carrier,normal}=N_{UTRA\_carrier}$, $N_{UTRA\_carrier\_TDD,normal}=N_{UTRA\_carrier\_TDD}$ and $N_{UTRA\_carrier,reduced}=0$ and $N_{UTA\_carrier\_TDD,reduced}=0$. No reduced performance carrier requirement applies to a UE not supporting Increased UE carrier monitoring E-UTRA or UTRA [2, 31]. Capabilities for number of carriers to monitor for a UE which does not support Increased carrier monitoring E-UTRA or Increased carrier monitoring UTRA are specified in section 4.2.2.9

Measurement and Evaluation of Serving Cell

The UE shall measure the RSRP and RSRQ level of the serving cell and evaluate the cell selection criterion S defined in [1] for the serving cell at least every DRX cycle.

The UE shall filter the RSRP and RSRQ measurements of the serving cell using at least 2 measurements. Within the set of measurements used for the filtering, at least two measurements shall be spaced by, at least DRX cycle/2.

If the UE is not configured with eDRX_IDLE cycle and has evaluated according to Table 9 in $N_{serv}$ consecutive DRX cycles that the serving cell does not fulfil the cell selection criterion S, the UE shall initiate the measurements of all neighbour cells indicated by the serving cell, regardless of the measurement rules currently limiting UE measurement activities. If the UE is configured with eDRX_IDLE cycle and has evaluated according to Table 10 in $N_{serv}$ consecutive DRX cycles within a single PTW that the serving cell does not fulfil the cell selection criterion S, the UE shall initiate the measurements of all neighbour cells indicated by the serving cell, regardless of the measurement rules currently limiting UE measurement activities.

If the UE in RRC_IDLE has not found any new suitable cell based on searches and measurements using the intra-frequency, inter-frequency and inter-RAT information indicated in the system information during the time T, the UE shall initiate cell selection procedures for the selected PLMN as defined in [1], where T=10 s if the UE is not configured with eDRX_IDLE cycle, and T=MAX(10 s, one eDRX_IDLE cycle) if the UE is configured with eDRX_IDLE cycle.

TABLE 9

| $N_{serv}$ | |
| --- | --- |
| DRX cycle length [s] | $N_{serv}$ [number of DRX cycles] |
| 0.32 | 4 |
| 0.64 | 4 |
| 1.28 | 2 |
| 2.56 | 2 |

TABLE 10

$N_{serv}$ for UE configured with eDRX_IDLE cycle

| eDRX_IDLE cycle length [s] | DRX cycle length [s] | PTW length [s] | $N_{serv}$ [number of DRX cycles] |
|---|---|---|---|
| 5.12 ≤ eDRX_IDLE cycle length ≤ 2621.44 | 0.32 | ≥1 | 2 |
| | 0.64 | ≥2 | 2 |
| | 1.28 | ≥3 | 2 |
| | 2.56 | ≥6 | 2 |

NOTE
1: The number of DRX cycles in this table is given for the DRX cycles within PTWs.
NOTE
2: The eDRX_IDLE cycle lengths are as specified in Section 10.5.5.32 of TS 24.008 [34].

For any requirement in this section, when the UE transitions between any two states when being configured with eDRX_IDLE, being configured with eDRX_IDLE cycle, changing eDRX_IDLE cycle length, or changing PTW configuration, the UE shall meet the transition requirement, which is the less stringent requirement of the two requirements corresponding to the first state and the second state, during the transition time interval which is the time corresponding to the transition requirement. After the transition time interval, the UE has to meet the requirement corresponding to the second state.

Measurements of Intra-Frequency E-UTRAN Cells

The UE shall be able to identify new intra-frequency cells and perform RSRP and RSRQ measurements of identified intra-frequency cells without an explicit intra-frequency neighbour list containing physical layer cell identities.

The UE shall be able to evaluate whether a newly detectable intra-frequency cell meets the reselection criteria defined in TS36.304 within $T_{detect,EUTRAN\_Intra}$ when that Treselection=0. An intra frequency cell is considered to be detectable according to RSRP, RSRP Ês/Iot, SCH_RP and SCH Ês/Iot defined in Annex B.1.1 for a corresponding band.

The UE shall measure RSRP and RSRQ at least every $T_{measure,EUTRAN\_Intra}$ for intra-frequency cells that are identified and measured according to the measurement rules.

The UE shall filter RSRP and RSRQ measurements of each measured intra-frequency cell using at least 2 measurements. Within the set of measurements used for the filtering, at least two measurements shall be spaced by at least $T_{measure,EUTRAN\_Intra}/2$ The UE shall not consider a E-UTRA neighbour cell in cell reselection, if it is indicated as not allowed in the measurement control system information of the serving cell.

For an intra-frequency cell that has been already detected, but that has not been reselected to, the filtering shall be such that the UE shall be capable of evaluating that the intra-frequency cell has met reselection criterion defined [1] within $T_{evaluate,E-UTRAN\_intra}$ when $T_{reselection}=0$, provided that the cell is at least 3 dB better ranked. When evaluating cells for reselection, the side conditions for RSRP and SCH apply to both serving and non-serving intra-frequency cells.

If $T_{reselection}$ timer has a non zero value and the intra-frequency cell is better ranked than the serving cell, the UE shall evaluate this intra-frequency cell for the $T_{reselection}$ time. If this cell remains better ranked within this duration, then the UE shall reselect that cell.

For UE not configured with eDRX_IDLE cycle, $T_{detect,EUTRAN\_Intra}$, $T_{measure,EUTRAN\_Intra}$ and $T_{evaluate, E-UTRAN\_intra}$ are specified in Table 11. For UE configured with eDRX_IDLE cycle, $T_{detect,EUTRAN\_Intra}$, $T_{measure,EUTRAN\_Intra}$ and $T_{evaluate, E-UTRAN\_intra}$ are specified in Table 12, where the requirements apply provided that the serving cell is configured with eDRX_IDLE and is the same in all PTWs during any of $T_{detect,EUTRAN\_Intra}$, $T_{measure,EUTRAN\_Intra}$ and $T_{evaluate, E-UTRAN\_intra}$ when multiple PTWs are used.

TABLE 11

$T_{detect,EUTRAN\_Intra}$, $T_{measure,EUTRAN\_Intra}$ and $T_{evaluate,E-UTRAN\_intra}$

| DRX cycle length [s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_intra}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

TABLE 12

$T_{detect,EUTRAN\_Intra}$, $T_{measure,EUTRAN\_Intra}$ and $T_{evaluate,E-UTRAN\_intra}$ for UE configured with eDRX_IDLE cycle

| eDRX_IDLE cycle length [s] | DRX cycle length [s] | PTW length [s] | $T_{detect,EUTRAN\_Intra}$ [s] (number of DRX cycles) | $T_{measure,EUTRAN\_Intra}$ [s] (number of DRX cycles) | $T_{evaluate,E-UTRAN\_intra}$ [s] (number of DRX cycles) |
|---|---|---|---|---|---|
| 5.12 ≤ eDRX_IDLE cycle length ≤ 2621.44 | .32 | 1 | $eDRX\_cycle\_length \times \left\lceil \dfrac{23}{\lceil PTW/DRX\_cycle\_length \rceil} \right\rceil$ (23) | 0.32 (1) | 0.64 (2) |
| | .64 | 2 | | 0.64 (1) | 1.28 (2) |
| | .28 | 3 | | 1.28 (1) | 2.56 (2) |
| | .56 | 6 | | 2.56 (1) | 5.12 (2) |

NOTE 1: The number of DRX cycles in this table is given for the DRX cycles within PTWs.
NOTE 2: The eDRX_IDLE cycle lengths are as specified in Section 10.5.5.32 of TS 24.008 [34].

For any requirement in this section, when the UE transitions between any two states when being configured with eDRX_IDLE, being configured with eDRX_IDLE cycle, changing eDRX_IDLE cycle length, or changing PTW configuration, the UE shall meet the transition requirement, which is the less stringent requirement of the two requirements corresponding to the first state and the second state, during the transition time interval which is the time corresponding to the transition requirement. After the transition time interval, the UE has to meet the requirement corresponding to the second state.

Measurements of Inter-Frequency E-UTRAN Cells

The UE shall be able to identify new inter-frequency cells and perform RSRP or RSRQ measurements of identified inter-frequency cells if carrier frequency information is provided by the serving cell, even if no explicit neighbour list with physical layer cell identities is provided.

If Srxlev>$S_{nonIntraSearchP}$ and Squal>$S_{nonIntraSearchQ}$ then the UE shall search for inter-frequency layers of higher priority at least every $T_{higher\_priority\_search}$ where $T_{higher\_priority\_search}$ is described in clause 4.2.2.

If Srxlev≤$S_{nonIntraSearchP}$ or Squal≤$S_{nonIntraSearchQ}$ then the UE shall search for and measure inter-frequency layers of higher, equal or lower priority in preparation for possible reselection. In this scenario, the minimum rate at which the UE is required to search for and measure higher priority layers shall be the same as that defined below.

If the UE is not configured with eDRX_IDLE cycle or configured with an eDRX_IDLE cycle not longer than 20.48 s, the UE shall be able to evaluate whether a newly detectable inter-frequency cell in normal performance group meets the reselection criteria defined in TS36.304 within $K_{carrier,normal}*T_{detect,EUTRAN\_Inter}$, and able to evaluate whether a newly detectable inter-frequency cell in reduced performance group meets the reselection criteria defined in TS36.304 within $6*K_{carrier,reduced}*T_{detect,EUTRAN\_Inter}$ if at least carrier frequency information is provided for inter-frequency neighbour cells by the serving cells when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. If the UE is configured with eDRX_IDLE cycle longer than 20.48 s, the UE shall be able to evaluate whether a newly detectable inter-frequency cell in normal performance group meets the reselection criteria defined in TS36.304 within $K_{carrier,normal}*T_{detect,EUTRAN\_Inter}$, and when Srxlev<3 dB or Squal<3 dB able to evaluate whether a newly detectable inter-frequency cell in reduced performance group meets the reselection criteria defined in TS36.304 within $6*K_{carrier,reduced}*T_{detect,EUTRAN\_Inter}$ if at least carrier frequency information is provided for inter-frequency neighbour cells by the serving cells when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. An inter-frequency cell is considered to be detectable according to RSRP, RSRP Ês/Iot, SCH_RP and SCH Ês/Iot defined in Annex B.1.2 for a corresponding Band.

When higher priority cells are found by the higher priority search, they shall be measured at least every $T_{measure,E-UTRAN\_Inter}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell. If the UE detects on a E-UTRA carrier a cell whose physical identity is indicated as not allowed for that carrier in the measurement control system information of the serving cell, the UE is not required to perform measurements on that cell.

If the UE is configured with eDRX_IDLE cycle not longer than 20.48 s, the UE shall measure RSRP or RSRQ at least every $K_{carrier,normal}*T_{measure,EUTRAN\_Inter}$ for identified lower or equal priority inter-frequency cells in normal performance group, and at least every $6*K_{carrier,reduced}*T_{measure,EUTRAN\_Inter}$ for identified lower or equal priority inter-frequency cells in reduced performance group. If the UE is configured with eDRX_IDLE cycle longer than 20.48 s, the UE shall measure RSRP or RSRQ at least every $K_{carrier,normal}*T_{measure,EUTRAN\_Inter}$ for identified lower or equal priority inter-frequency cells in normal performance group, and when Srxlev<3 dB or Squal<3 dB at least every $6*K_{carrier,reduced}*T_{measure,EUTRAN\_Inter}$ for identified lower or equal priority inter-frequency cells in reduced performance group. If the UE detects on a E-UTRA carrier a cell whose physical identity is indicated as not allowed for that carrier in the measurement control system information of the serving cell, the UE is not required to perform measurements on that cell.

The UE shall filter RSRP or RSRQ measurements of each measured higher, lower and equal priority inter-frequency cell using at least 2 measurements. Within the set of measurements used for the filtering, at least two measurements shall be spaced by at least $T_{measure,EUTRAN\_Inter}/2$.

The UE shall not consider a E-UTRA neighbour cell in cell reselection, if it is indicated as not allowed in the measurement control system information of the serving cell.

If the UE is configured with eDRX_IDLE cycle not longer than 20.48 s, for an inter-frequency cell that has been already detected, but that has not been reselected to, the filtering shall be such that the UE shall be capable of evaluating that the inter-frequency cell in normal performance group has met reselection criterion defined TS 36.304 within $K_{carrier,normal}*T_{evaluate,E-UTRAN\_Inter}$, and capable of evaluating that the inter-frequency cell in reduced performance group has met reselection criterion defined TS 36.304 within $6*K_{carrier,reduced}*T_{evaluate,E-UTRAN\_Inter}$, when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. If the UE is configured with eDRX_IDLE cycle longer than 20.48 s, for an inter-frequency cell that has been already detected, but that has not been reselected to, the filtering shall be such that the UE shall be capable of evaluating that the inter-frequency cell in normal performance group has met reselection criterion defined TS 36.304 within $K_{carrier,normal}*T_{evaluate,E-UTRAN\_Inter}$, and when Srxlev<3 dB or Squal<3 dB capable of evaluating that the inter-frequency cell in reduced performance group has met reselection criterion defined TS 36.304 within $6*K_{carrier,reduced}*T_{evaluate,E-UTRAN\_Inter}$, when $T_{reselection}=0$ provided that the reselection criteria is met by a margin of at least 5 dB for reselections based on ranking or 6 dB for RSRP reselections based on absolute priorities or 4 dB for RSRQ reselections based on absolute priorities. When evaluating cells for reselection, the side conditions for RSRP and SCH apply to both serving and inter-frequency cells.

If $T_{reselection}$ timer has a non zero value and the inter-frequency cell is better ranked than the serving cell, the UE shall evaluate this inter-frequency cell for the $T_{reselection}$ time. If this cell remains better ranked within this duration, then the UE shall reselect that cell.

For UE not configured with eDRX_IDLE cycle, $T_{detect,EUTRAN\_Inter}$, $T_{measure,EUTRAN\_Inter}$ and $T_{evaluate,\ E\text{-}UTRAN\_inter}$ are specified in Table 13. For UE configured with eDRX_IDLE cycle, $T_{detect,EUTRAN\_Inter}$, $T_{measure,EUTRAN\_Inter}$ and $T_{evaluate,\ E\text{-}UTRAN\_inter}$ are specified in Table 14, where the requirements apply provided that the serving cell is configured with eDRX_IDLE and is the same in all PTWs during any of $T_{detect,EUTRAN\_Inter}$, $T_{measure,EUTRAN\_Inter}$ and $T_{evaluate,\ E\text{-}UTRAN\_inter}$ when multiple PTWs are used.

TABLE 13

$T_{detect,EUTRAN\_Inter}$, $T_{measure,EUTRAN\_Inter}$ and $T_{evaluate,E\text{-}UTRAN\_Inter}$

| DRX cycle length [s] | $T_{detect,EUTRAN\_Inter}$ [s] (number of DRX cycles) | $T_{measure,EUTRAN\_Inter}$ [s] (number of DRX cycles) | $T_{evaluate,E\text{-}UTRAN\_Inter}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

TABLE 14

$T_{detect,EUTRAN\_Inter}$, $T_{measure,EUTRAN\_Inter}$ and $T_{evaluate,E\text{-}UTRAN\_inter}$ for UE configured with eDRX_IDLE cycle

| eDRX_IDLE cycle length [s] | DRX cycle length [s] | PTW length [s] | $T_{detect,EUTRAN\_Inter}$ [s] (number of DRX cycles) | $T_{measure,EUTRAN\_Inter}$ [s] (number of DRX cycles) | $T_{evaluate,EUTRAN\_inter}$ [s] (number of DRX cycles) |
|---|---|---|---|---|---|
| 5.12 ≤ eDRX_IDLE cycle length ≤ 2621.44 | 0.32 | ≥1 | $eDRX\_cycle\_length \times \left\lceil \dfrac{23}{\lceil PTW/DRX\_cycle\_length \rceil} \right\rceil$ (23) | 0.32 (1) | 0.64 (2) |
| | 0.64 | ≥2 | | 0.64 (1) | 1.28 (2) |
| | 1.28 | ≥3 | | 1.28 (1) | 2.56 (2) |
| | 2.56 | ≥6 | | 2.56 (1) | 5.12 (2) |

NOTE 1: The number of DRX cycles in this table is given for the DRX cycles within PTWs.
NOTE 2: The eDRX_IDLE cycle lengths are as specified in Section 10.5.5.32 of TS 24.008 [34].

For higher priority cells, a UE may optionally use a shorter value for $T_{measureE\text{-}UTRA\_Inter}$, which shall not be less than Max(0.64 s, one DRX cycle).

For any requirement in this section, when the UE transitions between any two states when being configured with eDRX_IDLE, being configured with eDRX_IDLE cycle, changing eDRX_IDLE cycle length, or changing PTW configuration, the UE shall meet the transition requirement, which is the less stringent requirement of the two requirements corresponding to the first state and the second state, during the transition time interval which is the time corresponding to the transition requirement. After the transition time interval, the UE has to meet the requirement corresponding to the second state.

Measurements of Inter-RAT Cells

If Srxlev>$S_{nonIntraSearchP}$ and Squal>$S_{nonIntraSearchQ}$ then the UE shall search for inter-RAT layers of higher priority at least every $T_{higher\_priority\_search}$ where $T_{higher\_priority\_search}$ is described in clause 4.2.2

If Srxlev≤$S_{nonIntraSearchP}$ or Squal≤$S_{nonIntraSearchQ}$ then the UE shall search for and measure inter-RAT layers of higher, lower priority in preparation for possible reselection. In this scenario, the minimum rate at which the UE is required to search for and measure higher priority inter-RAT layers shall be the same as that defined below for lower priority RATs.

For any requirement in this section, when the UE transitions between any two states when being configured with eDRX_IDLE, being configured with eDRX_IDLE cycle, changing eDRX_IDLE cycle length, or changing PTW configuration, the UE shall meet the transition requirement, which is the less stringent requirement of the two requirements corresponding to the first state and the second state, during the transition time interval which is the time corresponding to the transition requirement. After the transition time interval, the UE has to meet the requirement corresponding to the second state.

Measurements of UTRAN FDD Cells

When the measurement rules indicate that UTRA FDD cells are to be measured, the UE shall measure CPICH Ec/Io and CPICH RSCP of detected UTRA FDD cells in the neighbour frequency list at the minimum measurement rate specified in this section. The UE shall filter CPICH Ec/Io and CPICH RSCP measurements of each measured UTRA FDD cell using at least 2 measurements. Within the set of measurements used for the filtering, at least two measurements shall be spaced by at least half the minimum specified measurement period.

If the UE is not configured with eDRX_IDLE cycle or configured with eDRX_IDLE cycle not longer than 20.48 s, the UE shall evaluate whether newly detectable UTRA FDD cells in normal performance group have met the reselection criteria in TS 36.304 within time $(N_{UTRA\_carrier,normal})^* T_{detectUTRA\_FDD}$, and evaluate whether newly detectable UTRA FDD cells in reduced performance group have met the reselection criteria in TS 36.304 within time $6^*N_{UTRA\_carrier,reduced}^* T_{detectUTRA\_FDD}$ when Srxlev≤$S_{nonIntraSearchP}$ or Squal≤$S_{nonIntraSearchQ}$ when $Treselection_{RAT}=0$ provided that the reselection criteria is met by a margin of at least 6 dB for reselections based on RSCP, or a margin of at least 3 dB for reselections based on Ec/Io. If the UE is configured with eDRX_IDLE cycle longer than 20.48 s, the UE shall evaluate whether newly detectable UTRA FDD cells in normal performance group have met the reselection criteria in TS 36.304 within time $(N_{UTRA\_carrier,normal})^* T_{detectUTRA\_FDD}$, and when Srxlev<3 dB or Squal<3 dB evaluate whether newly detectable UTRA FDD cells in reduced performance group have met the reselection criteria in TS 36.304 within time $6^*N_{UTRA\_carrier,reduced}^* T_{detectUTRA\_FDD}$ when Srxlev≤$S_{nonIntraSearchP}$ or Squal≤$S_{nonIntraSearchQ}$ when Treselection$_{RAT}$=0 provided that the reselection criteria is met by a margin of at least 6 dB for reselections based on RSCP, or a margin of at least 3 dB for reselections based on Ec/Io.

If the UE is not configured with eDRX_IDLE cycle or configured with eDRX_IDLE cycle not longer than 20.48 s, cells which have been detected shall be measured at least every ($N_{UTRA\_carrier,normal}$)*$T_{measureUTRA\_FDD}$ for the cells in normal performance group, and at least every 6*$N_{UTRA\_carrier,reduced}$*$T_{measureUTRA\_FDD}$ for the cells in reduced performance group when Srxlev≤$S_{nonIntraSearchP}$ or Squal≤$S_{nonIntraSearchQ}$. If the UE is configured with eDRX_IDLE cycle longer than 20.48 s, cells which have been detected shall be measured at least every ($N_{UTRA\_carrier,normal}$)*$T_{measureUTRA\_FDD}$ for the cells in normal performance group, and when Srxlev<3 dB or Squal<3 dB at least every 6*$N_{UTRA\_carrier,reduced}$*$T_{measureUTRA\_FDD}$ for the cells in reduced performance group when Srxlev≤$S_{nonIntraSearchP}$ or Squal≤$S_{nonIntraSearchQ}$.

When higher priority UTRA FDD cells are found by the higher priority search, they shall be measured at least every $T_{measure,UTRA\_FDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell.

If the UE is not configured with eDRX_IDLE cycle or configured with eDRX_IDLE cycle not longer than 20.48 s, for a cell that has been already detected, but that has not been reselected to, the filtering shall be such that the UE shall be capable of evaluating that an already identified UTRA FDD cell has met reselection criterion defined in TS 36.304 [1] within ($N_{UTRA\_carrier,normal}$)*$T_{evaluateUTRA\_FDD}$ if the cell is in normal performance group and within 6*$N_{UTRA\_carrier,reduced}$*$T_{evaluateUTRA\_FDD}$ if the cell is in reduced performance group when $T_{reselection}$=0 provided that the reselection criteria is met by a margin of at least 6 dB for reselections based on RSCP, or a margin of at least 3 dB for reselections based on Ec/Io. If the UE is configured with eDRX_IDLE cycle longer than 20.48 s, for a cell that has been already detected, but that has not been reselected to, the filtering shall be such that the UE shall be capable of evaluating that an already identified UTRA FDD cell has met reselection criterion defined in TS 36.304 [1] within ($N_{UTRA\_carrier,normal}$)*$T_{evaluateUTRA\_FDD}$ if the cell is in normal performance group and when Srxlev<3 dB or Squal<3 dB within 6*$N_{UTRA\_carrier,reduced}$*$T_{evaluateUTRA\_FDD}$ if the cell is in reduced performance group when $T_{reselection}$=0 provided that the reselection criteria is met by a margin of at least 6 dB for reselections based on RSCP, or a margin of at least 3 dB for reselections based on Ec/Io.

If $T_{reselection}$ timer has a non zero value and the UTRA FDD cell is satisfied with the reselection criteria which are defined in [1], the UE shall evaluate this UTRA FDD cell for the $T_{reselection}$ time. If this cell remains satisfied with the reselection criteria within this duration, then the UE shall reselect that cell.

For UE not configured with eDRX_IDLE cycle, $T_{detectUTRA\_FDD}$, $T_{measureUTRA\_FDD}$ and $T_{evaluateUTRA\_FDD}$ are specified in Table 15. For UE configured with eDRX_IDLE cycle, $T_{detectUTRA\_FDD}$, $T_{measureUTRA\_FDD}$ and $T_{evaluateUTRA\_FDD}$ are specified in Table 16, where the requirements apply provided that the serving cell is configured with eDRX_IDLE and is the same in all PTWs during any of $T_{detectUTRA\_FDD}$, $T_{measureUTRA\_FDD}$ and $T_{evaluateUTRA\_FDD}$ when multiple PTWs are used.

TABLE 15

$T_{detectUTRA\_FDD}$, $T_{measureUTRA\_FDD}$ and $T_{evaluateUTRA\_FDD}$

| DRX cycle length [s] | $T_{detectUTRA\_FDD}$ [s] | $T_{measureUTRA\_FDD}$ [s] (number of DRX cycles) | $T_{evaluateUTRA\_FDD}$ [s] (number of DRX cycles) |
|---|---|---|---|
| 0.32 | 30 | 5.12 (16) | 15.36 (48) |
| 0.64 |  | 5.12 (8) | 15.36 (24) |
| 1.28 |  | 6.4 (5) | 19.2 (15) |
| 2.56 | 60 | 7.68 (3) | 23.04 (9) |

TABLE 16

$T_{detectUTRA\_FDD}$, $T_{measureUTRA\_FDD}$ and $T_{evaluateUTRA\_FDD}$ for UE configured with eDRX_IDLE cycle

| eDRX_IDLE cycle length [s] | DRX cycle length [s] | PTW length [s] | $T_{detectUTRA\_FDD}$ [s] (number of DRX cycles) | $T_{measureUTRA\_FDD}$ [s] (number of DRX cycles) | $T_{evaluateUTRA\_FDD}$ [s] (number of DRX cycles) |
|---|---|---|---|---|---|
| 5.12 ≤ eDRX_IDLE cycle length ≤ 2621.44 | 0.32 | ≥1 | Note 3 (23) | 0.96 (3) | Note 3 (9) |
|  | 0.64 | ≥2 |  | 1.92 (3) | Note 3 (9) |
|  | 1.28 | ≥4 |  | 3.84 (3) | Note 3 (9) |
|  | 2.56 | ≥8 |  | 7.68 (3) | Note 3 (9) |

NOTE 1: The number of DRX cycles in this table is given for the DRX cycles within PTWs.
NOTE 2: The eDRX_IDLE cycle lengths are as specified in Section 10.5.5.32 of TS 24.008 [34].
NOTE 3: The time is calculated depending on the number N of DRX cycles as follows:

$$eDRX\_cycle\_length \times \left\lceil \frac{N}{\lceil PTW/DRX\_cycle\_length \rceil} \right\rceil$$

For higher priority cells, a UE may optionally use a shorter value for $T_{measureUTRA\_FDD}$, which shall not be less than Max(0.64 s, one DRX cycle).

Measurements of UTRAN TDD Cells

When the measurement rules indicate that UTRA TDD cells are to be measured, the UE shall measure P-CCPCH RSCP of detected UTRA TDD cells in the neighbour frequency list at the minimum measurement rate specified in this section. The UE shall filter P-CCPCH RSCP measurements of each measured UTRA TDD cell using at least 2 measurements. Within the set of measurements used for the filtering, at least two measurements shall be spaced by at least half the minimum specified measurement period. If the UE is not configured with eDRX_IDLE cycle, P-CCPCH RSCP of UTRAN TDD cells shall not be filtered over a longer period than that specified in table 17. If the UE is configured with eDRX_IDLE cycle, P-CCPCH RSCP of UTRAN TDD cells shall not be filtered over a longer period than that specified in table 18.

If the UE is not configured with eDRX_IDLE cycle or configured with eDRX_IDLE cycle not longer than 20.48 s, the UE shall evaluate whether newly detectable UTRA TDD cells in normal performance group have met the reselection criteria in TS 36.304 within time ($N_{UTRA\_carrier\_TDD,normal}$)*$T_{detectUTRA\_TDD}$, and evaluate whether newly detectable UTRA TDD cells in reduced performance group have met the reselection criteria in TS 36.304 within time $6*N_{UTRA\_carrier\_TDD,reduced}*T_{detectUTRA\_TDD}$ when Srxlev≤$S_{nonIntraSearchP}$ or Squal≤$S_{nonIntraSearchQ}$ when $T_{reselection}$=0 provided that the reselection criteria is met by a margin of at least 6 dB. If the UE is configured with eDRX_IDLE cycle longer than 20.48 s, the UE shall evaluate whether newly detectable UTRA TDD cells in normal performance group have met the reselection criteria in TS 36.304 within time ($N_{UTRA\_carrier\_TDD,normal}$)*$T_{detectUTRA\_TDD}$, and when Srxlev<3 dB or Squal<3 dB evaluate whether newly detectable UTRA TDD cells in reduced performance group have met the reselection criteria in TS 36.304 within time $6*N_{UTRA\_carrier\_TDD,reduced}*T_{detectUTRA\_TDD}$ when Srxlev≤$S_{nonIntraSearchP}$ or Squal≤$S_{nonIntraSearchQ}$ when $T_{reselection}$=0 provided that the reselection criteria is met by a margin of at least 6 dB.

If the UE is not configured with eDRX_IDLE cycle or configured with eDRX_IDLE cycle not longer than 20.48 s, cells which have been detected shall be measured at least every ($N_{UTRA\_carrier\_TDD,normal}$)*$T_{measureUTRA\_TDD}$ for the cells in normal performance group, and at least every $6*N_{UTRA\_carrier\_TDD,reduced}*T_{measureUTRA\_TDD}$ for the cells in reduced performance group, when Srxlev≤$S_{nonIntraSearchP}$ or Squal≤$S_{nonIntraSearchQ}$. If the UE is configured with eDRX_IDLE cycle longer than 20.48 s, cells which have been detected shall be measured at least every ($N_{UTRA\_carrier\_TDD,normal}$)*$T_{measureUTRA\_TDD}$ for the cells in normal performance group, and when Srxlev<3 dB or Squal<3 dB at least every $6*N_{UTRA\_carrier\_TDD,reduced}*T_{measureUTRA\_TDD}$ for the cells in reduced performance group, when Srxlev≤$S_{nonIntraSearchP}$ or Squal≤$S_{nonIntraSearchQ}$.

When higher priority UTRA TDD cells are found by the higher priority search, they shall be measured at least every $T_{measure,UTRA\_TDD}$. If, after detecting a cell in a higher priority search, it is determined that reselection has not occurred then the UE is not required to continuously measure the detected cell to evaluate the ongoing possibility of reselection. However, the minimum measurement filtering requirements specified later in this clause shall still be met by the UE before it makes any determination that it may stop measuring the cell.

If the UE is not configured with eDRX_IDLE cycle or configured with eDRX_IDLE cycle not longer than 20.48 s, for a cell that has been already detected, but that has not been reselected to, the filtering shall be such that the UE shall be capable of evaluating that an already identified UTRA TDD cell has met reselection criterion defined in [1] within $N_{UTRA\_carrier\_TDD,normal}*T_{evaluateUTRA\_TDD}$ if the cell is in normal performance group and within $6*N_{UTRA\_carrier\_TDD,reduced}*T_{evaluateUTRA\_TDD}$ if the cell is in reduced performance group when $T_{reselection}$=0 provided that the reselection criteria is met by a margin of at least 6 dB. If the UE is configured with eDRX_IDLE cycle longer than 20.48 s, for a cell that has been already detected, but that has not been reselected to, the filtering shall be such that the UE shall be capable of evaluating that an already identified UTRA TDD cell has met reselection criterion defined in [1] within $N_{UTRA\_carrier\_TDD,normal}*T_{evaluateUTRA\_TDD}$ if the cell is in normal performance group and when Srxlev<3 dB or Squal<3 dB within $6*N_{UTRA\_carrier\_TDD,reduced}*T_{evaluateUTRA\_TDD}$ if the cell is in reduced performance group when $T_{reselection}$=0 provided that the reselection criteria is met by a margin of at least 6 dB.

If $T_{reselection}$ timer has a non zero value and the UTRA TDD cell is satisfied with the reselection criteria which are defined in [1], the UE shall evaluate this UTRA TDD cell for the $T_{reselection}$ time. If this cell remains satisfied with the reselection criteria within this duration, then the UE shall reselect that cell.

For UE not configured with eDRX_IDLE cycle, $T_{detectUTRA\_TDD}$, $T_{measureUTRA\_TDD}$ and $T_{evaluateUTRA\_TDD}$ are specified in Table 17. For UE configured with eDRX_IDLE cycle, $T_{detectUTRA\_TDD}$, $T_{measureUTRA\_TDD}$ and $T_{evaluateUTRA\_TDD}$ are specified in Table 18, where the requirements apply provided that the serving cell is configured with eDRX_IDLE and is the same in all PTWs during any of $T_{detectUTRA\_TDD}$, $T_{measureUTRA\_TDD}$ and $T_{evaluateUTRA\_TDD}$ when multiple PTWs are used.

TABLE 17

$T_{detectUTRA\_TDD}$, $T_{measureUTRA\_TDD}$ and $T_{evaluateUTRA\_TDD}$

| DRX cycle length [s] | $T_{detectUTRA\_TDD}$ [s] | $T_{measureUTRA\_TDD}$ [s] (number of DRX cycles) | $T_{evaluateUTRA\_TDD}$ [s] (number of DRX cycles) |
|---|---|---|---|
| 0.32 | 30 | 5.12 (16) | 15.36 (48) |
| 0.64 | | 5.12 (8) | 15.36 (24) |
| 1.28 | | 6.4 (5) | 19.2 (15) |
| 2.56 | 60 | 7.68 (3) | 23.04 (9) |

TABLE 18

$T_{detectUTRA\_TDD}$, $T_{measureUTRA\_TDD}$ and $T_{evaluateUTRA\_TDD}$ for UE configured with eDRX_IDLE cycle

| eDRX_IDLE cycle length [s] | DRX cycle length [s] | PTW length [s] | $T_{detectUTRA\_TDD}$ [s] (number of DRX cycles) | $T_{measureUTRA\_TDD}$ [s] (number of DRX cycles) | $T_{evaluateUTRA\_TDD}$ [s] (number of DRX cycles) |
|---|---|---|---|---|---|
| 5.12 ≤ eDRX_IDLE cycle length ≤ 2621.44 | 0.32 | ≥1 | Note 3 (23) | 0.96 (3) | Note 3 (9) |
| | 0.64 | ≥2 | | 1.92 (3) | Note 3 (9) |
| | 1.28 | ≥4 | | 3.84 (3) | Note 3 (9) |
| | 2.56 | ≥8 | | 7.68 (3) | Note 3 (9) |

NOTE 1: The number of DRX cycles in this table is given for the DRX cycles within PTWs.
NOTE 2: The eDRX_IDLE cycle lengths are as specified in Section 10.5.5.32 of TS 24.008 [34].
NOTE 3: The time is calculated depending on the number N of DRX cycles as follows:

$$eDRX\_cycle\_length \times \left\lceil \frac{N}{\lceil PTW/DRX\_cycle\_length \rceil} \right\rceil$$

For higher priority cells, a UE may optionally use a shorter value for $T_{measureUTRA\_TDD}$, which shall not be less than Max(0.64 s, one DRX cycle).

Measurements of GSM Cells

When the measurement rules defined in [1] indicate that E-UTRAN inter-frequencies or inter-RAT frequency cells are to be measured, the UE shall measure the signal level of the GSM BCCH carriers if the GSM BCCH carriers are indicated in the measurement control system information of the serving cell. GSM BCCH carriers of lower priority than the serving cell shall be measured at least every $T_{measure,GSM}$.

When higher priority GSM BCCH carriers are found by the higher priority search, they shall be measured at least every $T_{measure,GSM}$, and the UE shall decode the BSIC of the GSM BCCH carrier. If, after detecting a cell in a higher priority search, it is determined that reselection has not occurred then the UE is not required to continuously measure the detected cell to evaluate the ongoing possibility of reselection, or to continuously verify the BSIC of the GSM BCCH carrier every 30 s. However, the minimum measurement filtering requirements specified later in this clause shall still be met by the UE before it makes any determination that it may stop measuring the cell.

The UE shall maintain a running average of 4 measurements for each GSM BCCH carrier. The measurement samples for each cell shall be as far as possible uniformly distributed over the averaging period.

If continuous GSM measurements are required by the measurement rules in [1], the UE shall attempt to verify the BSIC at least every 30 seconds for each of the 4 strongest GSM BCCH carriers. If a change of BSIC is detected for one GSM cell then that GSM BCCH carrier shall be treated as a new GSM neighbour cell. If the UE detects on a BCCH carrier a BSIC which is indicated as not allowed for that carrier in the measurement control system information of the serving cell, the UE is not required to perform BSIC re-confirmation for that cell.

The UE shall not consider the GSM BCCH carrier in cell reselection, if the UE cannot demodulate the BSIC of that GSM BCCH carrier. Additionally, the UE shall not consider a GSM neighbour cell in cell reselection, if it is indicated as not allowed in the measurement control system information of the serving cell.

If $T_{reselection}$ timer has a non zero value and the GSM cell is satisfied with the reselection criteria which are defined in [1], the UE shall evaluate this GSM cell for the $T_{reselection}$ time. If this cell remains satisfied with the reselection criteria within this duration, then the UE shall reselect that cell.

For UE not configured with eDRX_IDLE cycle, $T_{measure,GSM}$ is specified in Table 19. For UE configured with eDRX_IDLE cycle, $T_{measure,GSM}$ is specified in Table 20, where the requirements apply provided that the serving cell is configured with eDRX_IDLE and is the same in all PTWs during $T_{measure,GSM}$ when multiple PTWs are used.

TABLE 19

$T_{measure,GSM}$

| DRX cycle length [s] | $T_{measure,GSM}$ [s] (number of DRX cycles) |
|---|---|
| 0.32 | 5.12 (16) |
| 0.64 | 5.12 (8) |
| 1.28 | 6.4 (5) |
| 2.56 | 7.68 (3) |

TABLE 20

$T_{measure,GSM}$ for UE configured with eDRX_IDLE cycle

| eDRX_IDLE cycle length [s] | DRX cycle length [s] | PTW length [s] | $T_{measure,GSM}$ [s] (number of DRX cycles) |
|---|---|---|---|
| 5.12 ≤ eDRX_IDLE cycle length ≤ 2621.44 | 0.32 | ≥1 | 0.96 (3) |
| | 0.64 | ≥2 | 1.92 (3) |
| | 1.28 | ≥4 | 3.84 (3) |
| | 2.56 | ≥8 | 7.68 (3) |

NOTE
1: The number of DRX cycles in this table is given for the DRX cycles within PTWs.

NOTE
2: The eDRX_IDLE cycle lengths are as specified in Section 10.5.5.32 of TS 24.008 [34].

Measurements of HRPD Cells

In order to perform measurement and cell reselection to HRPD cell, the UE shall acquire the timing of HRPD cells.

When the measurement rules indicate that HRPD cells are to be measured, the UE shall measure CDMA2000 HRPD Pilot Strength of HRPD cells in the neighbour cell list at the minimum measurement rate specified in this section.

The parameter 'Number of HRPD Neighbor Frequency', which is transmitted on E-UTRAN BCCH, is the number of carriers used for all HRPD cells in the neighbour cell list.

When the E-UTRA serving cell fulfils Srxlev>$S_{nonIntraSearchP}$ and Squal>$S_{nonIntraSearchQ}$, the UE shall search for CDMA2000 HRPD layers of higher priority at least every $T_{higher\_priority\_search}$ where $T_{higher\_priority\_search}$ is defined in clause 4.2.2.

For CDMA2000 HRPD cells which have been detected, the UE shall measure CDMA2000 HRPD Pilot Strength at least every (Number of HRPD Neighbor Frequency)* $T_{measureHRPD}$, when the E-UTRA serving cell Srxlev≤$S_{nonIntraSearchP}$ or Squal≤$S_{nonIntraSearchQ}$.

The UE shall be capable of evaluating that the CDMA2000 HRPD cell has met cell reselection criterion defined in [1] within $T_{evaluateHRPD}$.

For UE not configured with eDRX_IDLE cycle, Table 21 gives values of $T_{measureHRPD}$ and $T_{evaluateHRPD}$. For UE configured with eDRX_IDLE cycle, $T_{measureHRPD}$ and $T_{evaluateHRPD}$ are specified in Table 22, where the requirements apply provided that the serving cell is configured with eDRX_IDLE and is the same in all PTWs during any of $T_{measureHRPD}$ and $T_{evaluateHRPD}$ when multiple PTWs are used.

TABLE 21

$T_{measureHRPD}$ and $T_{evaluateHRPD}$

| DRX cycle length [s] | $T_{measureHRPD}$ [s] (number of DRX cycles) | $T_{evaluateHRPD}$ [s] (number of DRX cycles) |
|---|---|---|
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

TABLE 22

$T_{measureHRPD}$ and $T_{evaluateHRPD}$ for UE configured with eDRX_IDLE cycle

| eDRX_IDLE cycle length [s] | DRX cycle length [s] | PTW length [s] | $T_{measureHRPD}$ [s] (number of DRX cycles) | $T_{evaluateHRPD}$ [s] (number of DRX cycles) |
|---|---|---|---|---|
| 5.12 ≤ eDRX_IDLE cycle length ≤ 2621.44 | 0.32 | ≥1 | 0.96 (3) | Note 3 (9) |
| | 0.64 | ≥2 | 1.92 (3) | Note 3 (9) |
| | 1.28 | ≥4 | 3.84 (3) | Note 3 (9) |
| | 2.56 | ≥8 | 7.68 (3) | Note 3 (9) |

NOTE 1: The number of DRX cycles in this table is given for the DRX cycles within PTWs.
NOTE 2: The eDRX_IDLE cycle lengths are as specified in Section 10.5.5.32 of TS 24.008 [34].
NOTE 3: The time is calculated depending on the number N of DRX cycles as follows:

$$eDRX\_cycle\_length \times \left\lceil \frac{N}{\lceil PTW/DRX\_cycle\_length \rceil} \right\rceil$$

If $T_{reselection}$ timer has a non zero value and the CDMA2000 HRPD cell is satisfied with the reselection criteria which are defined in [1], the UE shall evaluate this CDMA2000 HRPD cell for the $T_{reselection}$ time. If this cell remains satisfied with the reselection criteria within this duration, then the UE shall reselect that cell.

Measurements of cdma2000 1×

In order to perform measurement and cell reselection to cdma2000 1× cell, the UE shall acquire the timing of cdma2000 1× cells.

When the measurement rules indicate that cdma2000 1× cells are to be measured, the UE shall measure cdma2000 1×RTT Pilot Strength of cdma2000 1× cells in the neighbour cell list at the minimum measurement rate specified in this section.

The parameter 'Number of CDMA2000 1× Neighbor Frequency', which is transmitted on E-UTRAN BCCH, is the number of carriers used for all cdma2000 1× cells in the neighbour cell list.

When the E-UTRA serving cell fulfils Srxlev>$S_{nonIntraSearchP}$ and Squal>$S_{nonIntraSearchQ}$, the UE shall search for cdma2000 1× layers of higher priority at least every $T_{higher\_priority\_search}$ where $T_{higher\_priority\_search}$ is defined in clause 4.2.2.

For CDMA2000 1× cells which have been detected, the UE shall measure CDMA2000 1×RTT Pilot Strength at least every (Number of CDMA2000 1× Neighbor Frequency) *$T_{measureCDMA2000\_1\times}$, when the E-UTRA serving cell Srxlev≤$S_{nonIntraSearchP}$ or Squal≤$S_{nonIntraSearchQ}$. The UE shall be capable of evaluating that the cdma2000 1× cell has met cell reselection criterion defined in [1] within $T_{evaluateCDMA2000\_1\times}$.

For UE not configured with eDRX_IDLE cycle, Table 23 gives values of $T_{measureCDMA2000\_1\times}$ and $T_{evaluateCDMA2000\_1\times}$. For UE configured with eDRX_IDLE cycle, $T_{measureCDMA2000\_1\times}$ and $T_{evaluateCDMA2000\_1\times}$ are specified in Table 24 where the requirements apply provided that the serving cell is configured with eDRX_IDLE and is the same in all PTWs during any of $T_{measureCDMA2000\_1\times}$ and $T_{evaluateCDMA2000\_1\times}$ when multiple PTWs are used.

TABLE 23

$T_{measureCDMA2000\_1X}$ and $T_{evaluateCDMA2000\_1X}$

| DRX cycle length [s] | $T_{measureCDMA2000\_1X}$ [s] (number of DRX cycles) | $T_{evaluateCDMA2000\_1X}$ [s] (number of DRX cycles) |
|---|---|---|
| 0.32 | 5.12 (16) | 15.36 (48) |
| 0.64 | 5.12 (8) | 15.36 (24) |
| 1.28 | 6.4 (5) | 19.2 (15) |
| 2.56 | 7.68 (3) | 23.04 (9) |

TABLE 24

$T_{measureCDMA2000\_1X}$ and $T_{evaluateCDMA2000\_1X}$ for UE configured with eDRX_IDLE cycle

| eDRX_IDLE cycle length [s] | DRX cycle length [s] | PTW length [s] | $T_{measureCDMA2000\_1X}$ [s] (number of DRX cycles) | $T_{evaluateCDMA2000\_1X}$ [s] (number of DRX cycles) |
|---|---|---|---|---|
| 5.12 ≤ eDRX_IDLE cycle length ≤ 2621.44 | 0.32 | ≥1 | 0.96 (3) | Note 3 (9) |
| | 0.64 | ≥2 | 1.92 (3) | Note 3 (9) |
| | 1.28 | ≥4 | 3.84 (3) | Note 3 (9) |
| | 2.56 | ≥8 | 7.68 (3) | Note 3 (9) |

NOTE 1: The number of DRX cycles in this table is given for the DRX cycles within PTWs.
NOTE 2: The eDRX_IDLE cycle lengths are as specified in Section 10.5.5.32 of TS 24.008 [34].
NOTE 3: The time is calculated depending on the number N of DRX cycles as follows:

$$eDRX\_cycle\_length \times \left\lceil \frac{N}{\lceil PTW/DRX\_cycle\_length \rceil} \right\rceil$$

If $T_{reselection}$ timer has a non zero value and the CDMA2000 1× cell is satisfied with the reselection criteria which are defined in [1], the UE shall evaluate this CDMA2000 1× cell for the $T_{reselection}$ time. If this cell remains satisfied with the reselection criteria within this duration, then the UE shall reselect that cell.

4.2.2.6 Evaluation of Cell Re-Selection Criteria

The UE shall evaluate the intra-frequency, inter-frequency and inter-RAT cell reselection criteria defined in [1] at least every DRX cycle. When a non zero value of $T_{reselection}$ is used, the UE shall only perform reselection on an evaluation which occurs simultaneously to, or later than the expiry of the $T_{reselection}$ timer.

For UE configured with eDRX_IDLE cycle, the cell reselection criteria shall be evaluated within at least every DRX cycle within the PTW.

Maximum Interruption in Paging Reception

UE shall perform the cell re-selection with minimum interruption in monitoring downlink channels for paging reception. When the UE is configured with eDRX_IDLE cycle, the UE shall not miss any paging in a PTW provided the paging is sent in at least [2] DRX cycles before the end of that PTW.

At intra-frequency and inter-frequency cell re-selection, the UE shall monitor the downlink of serving cell for paging reception until the UE is capable to start monitoring downlink channels of the target intra-frequency and inter-frequency cell for paging reception. The interruption time shall not exceed $T_{SI-EUTRA}+50$ ms.

At inter-RAT cell re-selection, the UE shall monitor the downlink of serving cell for paging reception until the UE is capable to start monitoring downlink channels for paging reception of the target inter-RAT cell. For E-UTRAN to UTRA cell re-selection the interruption time must not exceed $T_{SI-UTRA}+50$ ms. For E-UTRAN to GSM cell re-selection the interruption time must not exceed $T_{BCCH}+50$ ms.

$T_{SI-EUTRA}$ is the time required for receiving all the relevant system information data according to the reception procedure and the RRC procedure delay of system information blocks defined in TS 36.331 [2] for a E-UTRAN cell.

$T_{SI-UTRA}$ is the time required for receiving all the relevant system information data according to the reception procedure and the RRC procedure delay of system information blocks defined in [7] for a UTRAN cell.

$T_{BCCH}$ is the maximum time allowed to read BCCH data from a GSM cell defined in [8].

These requirements assume sufficient radio conditions, so that decoding of system information can be made without errors and does not take into account cell re-selection failure.

At cell re-selection to HRPD, the UE shall monitor the downlink of serving cell for paging reception until the UE is capable of starting to monitor downlink channels for paging reception of the target HRPD cell. For HRPD cell re-selection the interruption time must not exceed $T_{SI-HRPD}+50$ ms.

$T_{SI-HRPD}$ is the time required for receiving all the relevant system information data according to the reception procedure and the upper layer (Layer 3) procedure delay of system information blocks defined in [11] in for HRPD cell.

At cell re-selection to cdma2000 1x, the UE shall monitor the downlink of serving cell for paging reception until the UE is capable of starting to monitor downlink channels for paging reception of the target cdma2000 1x cell. For cdma2000 1x cell re-selection the interruption time must not exceed $T_{SI-cdma2000\_1x}+50$ ms.

$T_{SI-cdma2000\_1x}$ is the time required for receiving all the relevant system information data according to the reception procedure and the upper layer (Layer 3) procedure delay of system information blocks defined in [15] for cdma2000 1x cell.

For any requirement in this section, when the UE transitions between any two states when being configured with eDRX_IDLE, being configured with eDRX_IDLE cycle, changing eDRX_IDLE cycle length, or changing PTW configuration, the UE shall meet the transition requirement, which is the less stringent requirement of the two requirements corresponding to the first state and the second state, during the transition time interval which is the time corresponding to the transition requirement. After the transition time interval, the UE has to meet the requirement corresponding to the second state.

UE Measurement Capability

For idle mode cell re-selection purposes, the UE shall be capable of monitoring at least:
  Intra-frequency carrier, and
  Depending on UE capability, 3 FDD E-UTRA inter-frequency carriers, and
  Depending on UE capability, 3 TDD E-UTRA inter-frequency carriers, and
  Depending on UE capability, 3 FDD UTRA carriers, and
  Depending on UE capability, 3 TDD UTRA carriers, and
  Depending on UE capability, 32 GSM carriers, and
  Depending on UE capability, 3 cdma2000 1x carriers, and
  Depending on UE capability, 3 HRPD carriers.

In addition to the requirements defined above, a UE supporting E-UTRA measurements in RRC_IDLE state shall be capable of monitoring a total of at least 8 carrier frequency layers, which includes serving layer, comprising of any above defined combination of E-UTRA FDD, E-UTRA TDD, UTRA FDD, UTRA TDD, GSM (one GSM layer corresponds to 32 cells), cdma2000 1x and HRPD layers.

UE Measurement Capability (Increased UE Carrier Monitoring)

UE which support Increased UE carrier monitoring E-UTRA according to the capabilities in [2,31] shall be capable of monitoring at least
  Depending on UE capability, 8 FDD E-UTRA inter-frequency carriers, and
  Depending on UE capability, 8 TDD E-UTRA inter-frequency carriers UE which support increased UE carrier monitoring UTRA according to the capabilities in [2,31] shall additionally be capable of monitoring at least
  Depending on UE capability, 6 FDD UTRA carriers, and
  Depending on UE capability, 7 TDD UTRA carriers, and In addition to the requirements defined above, a UE supporting E-UTRA measurements in RRC_IDLE state and supporting Increased UE carrier monitoring E-UTRA or increased UE carrier monitoring UTRA according to the capabilities in [2,31] shall be capable of monitoring a total of at least 13 carrier frequency layers, which includes serving layer, comprising of any above defined combination of E-UTRA FDD, E-UTRA TDD, UTRA FDD, UTRA TDD, GSM (one GSM layer corresponds to 32 cells), cdma2000 1x and HRPD layers.

The requirements in this section apply for UE regardless of their capability to support eDRX_IDLE.

Reselection to CSG Cells

Note: Requirements in this clause are minimum requirements defined to ensure the testability of autonomous CSG search. Further information on autonomous search times in practical deployments is available in [25].

Reselection from non CSG to CSG cells may be performed using UE autonomous search as defined in [1] when at least one CSG ID is included in the UE's CSG whitelist. The requirements in this clause are valid for reselection to CSG cells previously visited by the UE when the radio configuration parameters, including the carrier frequency and physical cell identity of the CSG cell, non CSG cell and other neighbour cells are unchanged from the most recent previous visit.

NOTE: According to [1], the UE autonomous search function, per UE implementation, determines when and/or where to search for allowed CSG cells.

Reselection from a Non CSG to an Inter-Frequency CSG Cell

The UE shall perform search and reselection to an allowed inter-frequency CSG cell that has met CSG reselection criterion defined in [1] and that is in its whitelist, within 6 minutes in the conditions shown in table 25. There is no need for statistical testing of this requirement.

TABLE 25

Parameters for CSG inter-frequency reselection

| Parameter | Unit | Cell 1 | Cell 2 |
|---|---|---|---|
| EARFCN[Note1] | | Channel 1 | Channel 2 |
| CSG indicator | | False | True |
| Physical cell identity[Note1] | | 1 | 2 |
| CSG identity | | Not sent | Sent (Already stored in UE whitelist from previous visit) |
| Propagation conditions | | Static, non multipath | |
| CSG cell previously visited by UE | | Yes | |
| PBCH_RA | dB | 0 | 0 |
| PBCH_RB | dB | | |
| PSS_RA | dB | | |
| SSS_RA | dB | | |
| PCFICH_RB | dB | | |
| PHICH_RA | dB | | |
| PHICH_RB | dB | | |
| PDCCH_RA | dB | | |
| PDCCH_RB | dB | | |
| PDSCH_RA | dB | | |
| PDSCH_RB | dB | | |
| OCNG_RA[Note1] | dB | | |
| OCNG_RB[Note1] | dB | | |
| Qrxlevmin | dBm | −140 | −140 |
| $N_{OC}$ | dBm/15 kHz | Off | |
| RSRP[Note2] | dBm/15 KHz | −110 | −110 |

[Note1]For this requirement to be applicable, the EARFCN and physical cell identity for cell 1 and cell 2 shall be unchanged from when the CSG cell was visited previously
[Note2]Chosen to ensure that CSG autonomous search has a high probability of success on every attempt made by UE Reselection from a Non CSG to an Inter-RAT UTRAN FDD CSG Cell The UE shall perform search and reselection to an allowed inter-RAT UTRAN FDD CSG cell that has met CSG reselection criterion defined in [1] and that is in its whitelist, within 6 minutes in the conditions shown in table 26. There is no need for statistical testing of this requirement.

TABLE 26

Parameters for CSG inter-RAT UTRAN FDD reselection

| Parameter | Unit | Cell 1 | Cell 2 |
|---|---|---|---|
| EARFCN[Note1] | | Channel 1 | Channel 2 |
| UARFCN[Note1] | | N/A | Channel 2 |
| CSG indicator | | False | True |
| Physical cell identity[Note1] | | 1 | 2 |
| Primary scrambling code[Note1] | | N/A | Scrambling code 2 |
| CSG identity | | Not sent | Sent (Already stored in UE whitelist from previous visit) |

TABLE 26-continued

Parameters for CSG inter-RAT UTRAN FDD reselection

| Parameter | Unit | Cell 1 | Cell 2 |
|---|---|---|---|
| Propagation conditions | | Static, non multipath | |
| CSG cell previously visited by UE | | Yes | |
| PBCH_RA | dB | 0 | N/A |
| PBCH_RB | dB | | |
| PSS_RA | dB | | |
| SSS_RA | dB | | |
| PCFICH_RB | dB | | |
| PHICH_RA | dB | | |
| PHICH_RB | dB | | |
| PDCCH_RA | dB | | |
| PDCCH_RB | dB | | |
| PDSCH_RA | dB | | |
| PDSCH_RB | dB | | |
| OCNG_RA[Note1] | dB | | |
| OCNG_RB[Note1] | dB | | |
| Qrxlevmin | dBm | −140 | |
| $N_{OC}$ | dBm/15 kHz | Off | |
| RSRP[Note2] | dBm/15 KHz | −110 | |
| CPICH_RSCP[Note2] | dBm | N/A | −100 |
| CPICH_Ec/Ior | dB | | −10 |
| PCCPCH_Ec/Ior | dB | | −12 |
| SCCPCH_Ec/Ior | dB | | −12 |
| AICH_Ec/Ior | dB | | −15 |
| SCH_Ec/Ior | dB | | −15 |
| PICH_Ec/Ior | dB | | −15 |
| $I_{OC}$ | dBm/3.84 MHz | | Off |

[Note1]For this requirement to be applicable, the EARFCN and physical cell identity for cell 1 and the UARFCN and scrambling code for cell 2 shall be unchanged from when the CSG cell was visited previously
[Note2]Chosen to ensure that CSG autonomous search has a high probability of success on every attempt made by UE Minimization of Drive Tests (MDT)

UE supporting minimisation of drive tests in RRC_IDLE shall be capable of:

logging measurements in RRC_IDLE, reporting the logged measurements and meeting requirements in this clause;

logging of RRC connection establishment failure, reporting the logged failure and meeting requirements in this clause;

logging of radio link failure and handover failure, reporting the logged failure and meeting requirements in this clause.

Introduction

The logged MDT requirements consist of measurement requirements as specified in clause 4.3.2 and relative time stamp accuracy requirements as specified in clause 4.3.3. Both sets of requirements are applicable for intra-frequency, inter-frequency and inter-RAT cases in RRC_IDLE state. The MDT procedures are described in [27].

For RRC connection establishment failure logging and reporting, the MDT requirements consist of requirements for measurements performed and logged in RRC_IDLE state specified in clause 4.3.2 and relative time stamp accuracy requirement for RRC connection establishment failure log reporting as specified in clause 4.3.4.

Measurements

The requirements specified in this clause apply for the measurements (GSM carrier RSSI, UTRA CPICH RSCP, UTRA CPICH Ec/Io, P-CCPCH RSCP for UTRA 1.28 TDD, E-UTRA RSRP, E-UTRA RSRQ, MBSFN RSRP, MBSFN RSRQ, and MCH BLER) performed and logged by the UE for MDT in RRC_IDLE. The requirements apply for the measurements included in logged MDT reports and RRC connection establishment failure reports.

Requirements

The measurement values that are used to meet serving cell and reselection requirements as specified in sections 4.2.2.1, 4.2.2.3, 4.2.2.4, 4.2.2.5, MBSFN measurement requirements as specified in section 4.4, shall also apply to values logged for MDT measurements in RRC_IDLE state.

Relative Time Stamp Accuracy

The relative time stamp for a logged measurement is defined as the time from the moment the MDT configuration was received at the UE until the measurement was logged, see TS 36.331 [2].

Requirements

The accuracy of the relative time stamping is such that the drift of the time stamping shall be not more than ±2 seconds per hour.

Relative Time Stamp Accuracy for RRC Connection Establishment Failure Log Reporting Relative time stamp for RRC connection establishment failure log reporting is defined as the time elapsed from the last RRC connection establishment failure to the time when the log is included in the report TS 36.331 [2]. The UE shall report the RRC connection establishment failure log, while meeting the accuracy requirement specified in clause 4.3.4.1.

Requirements

The accuracy of the relative time stamping for RRC connection establishment failure log reporting is such that the drift of the time stamping shall not be larger than ±0.72 seconds per hour and ±10 seconds over 48 hours. The relative time stamp accuracy requirements shall apply provided that:

no power off or detach occurs after the RRC connection establishment failure had been detected and until the log is time-stamped.

NOTE: This requirement does not need to be tested.

Relative Time Stamp Accuracy for Radio Link Failure and Handover Failure Log Reporting The UE shall report the radio link and handover failure log, while meeting the accuracy requirements specified in this section.

Requirements for timeSinceFailure

Relative time stamp accuracy requirements for timeSinceFailure reported for MDT in a radio link failure or handover failure log are specified in this clause. timeSinceFailure determines the time elapsed from the last radio link failure or handover failure in E-UTRA to the time when the log is included in the report TS 36.331 [2].

The accuracy of the relative time stamping for timeSinceFailure is such that the drift of the time stamping shall not be larger than +0.72 seconds per hour and +10 seconds over 48 hours. These relative time stamp accuracy requirements shall apply provided that:

no power off or detach occurs after the RLF or handover failure had been detected and until the log is time-stamped.

MB SFN Measurements—Introduction

The requirements specified in Section 4.4 apply for MBSFN measurements (MBSFN RSRP, MBSFN RSRQ, and MCH BLER defined in [4]), which are performed in RRC_IDLE state and logged for MDT by UEs which are MBMS-capable and also indicate their MBSFN measurement logging capability [2].

UE shall measure MBSFN RSRP, MBSFN RSRQ and MCH BLER only in subframes and on carriers where UE is decoding PMCH. The requirements are specified for any carrier where PMCH is received by UE. The requirements specified in this section apply for any carrier frequency with configured MBSFN subframes with PMCH, which may be the same as or different from any serving unicast carrier.

The UE receiving PMCH on any non-serving carrier and performing MBSFN measurements shall not cause interruptions on any serving carrier in the subframes with paging and non-MBSFN multicast transmissions such as system information.

MBSFN RSRP Measurements

For UE in RRC_IDLE, the physical layer shall be capable of performing the MBSFN RSRP measurement [4] within the MBSFN RSRP measurement period and log the measurement, while meeting the MBSFN RSRP measurement accuracy requirements specified in section 9.8.2. The MBSFN RSRP measurement logging shall be according to the MBSFN RSRP measurement report mapping specified in Section 9.8.2.2.

The MBSFN RSRP measurement period is defined as MAX(640 ms, period during which the UE decodes [5, Section 10] 5 subframes containing PMCH transmissions).

The same requirement applies for UE configured with DRX or eDRX_IDLE.

MB SFN RSRQ Measurements

For UE in RRC_IDLE, the physical layer shall be capable of performing the MBSFN RSRQ measurement [4] within the MBSFN RSRP measurement period and report the measurement, while meeting the MBSFN RSRQ measurement accuracy requirements specified in section 9.8.3. The MBSFN RSRQ measurement logging shall be according to the MBSFN RSRQ measurement report mapping specified in Section 9.8.3.2.

The MBSFN RSRQ measurement period is defined as MAX(640 ms, period during which the UE decodes [5, Section 10] 5 subframes containing PMCH transmissions).

The same requirement applies for UE configured with DRX or eDRX_IDLE.

MCH BLER Measurements

The UE physical layer shall be capable of performing and logging the MCH BLER measurement [4] within the MCH BLER measurement period.

The MCH BLER measurement period is equal to the MBSFN logging interval configured by higher layers [2].

The MCH BLER logging shall be according to the MCH BLER measurement report mapping specified in Section 9.8.4.

The same requirement applies for UE configured with DRX or eDRX_IDLE.

The invention claimed is:

1. A method in a wireless device capable of operating in discontinuous activity mode, the method comprising:

determining that the wireless device is configured with a discontinuous reception (DRX) cycle longer than a DRX threshold;

obtaining a reduced measurement group comprising a first set of one or more cells or carriers to be measured;

comparing a signal level of the serving cell at the wireless device with a signal threshold;

when the signal level of the serving cell at the wireless device is below the signal threshold, performing a measurement on the first set of one or more cells or carriers of the reduced measurement group; and when the signal level of the serving cell at the wireless device is equal to or above the signal threshold, performing a measurement on a second set of a plurality of cells or carriers of a normal measurement group, and wherein the first set of the one or more cells or carriers of the reduced measurement group is less than the second set of the plurality of cells or carriers of the normal measurement group.

2. The method of claim 1, further comprising:
obtaining the normal measurement group comprising the second set of the plurality of cells or carriers to be measured.

3. The method of claim 1, further comprising performing an operational task using a measurement result of at least one of the measurements on the first set of one or more cells or carriers of the reduced measurement group or one of the measurements on the second set of the plurality of cells or carriers of the normal measurement group.

4. A method in a network node capable of operating in discontinuous activity mode, the method comprising:
receiving, from a wireless device, a measurement result of at least one of:
a measurement on a first set of one or more cells or carriers comprising a reduced measurement group if a signal level of a serving cell at the wireless device is below a signal threshold; or
a measurement on a second set of a plurality of cells or carriers comprising a normal measurement group if the signal level of the serving cell at the wireless device is equal to or above the signal threshold; and
performing an operational task using the received measurement result, and
wherein the first set of the one or more cells or carriers of the reduced measurement group is less than the second set of the plurality of cells or carriers of the normal measurement group.

5. The method of claim 4, further comprising:
obtaining an indication that the wireless device is configured with a discontinuous reception (DRX) cycle longer than a DRX threshold; and
transmitting, to the wireless device, a configuration including at least one of:
the reduced measurement group, the reduced measurement group comprising the first set of one or more cells or carriers to be measured; and
the normal measurement group, the normal measurement group comprising the second set of the plurality of cells or carriers to be measured.

6. A wireless device capable of operating in discontinuous activity mode, the wireless device comprising processing circuitry, the processing circuitry operable to:
determine that the wireless device is configured with a discontinuous reception (DRX) cycle longer than a DRX threshold;
obtain a reduced measurement group comprising a first set of one or more cells or carriers to be measured;
compare a signal level of the serving cell at the wireless device with a signal threshold;
when the signal level of the serving cell at the wireless device is below the signal threshold, perform a measurement on the first set of one or more cells or carriers of the reduced measurement group; and
when the signal level of the serving cell at the wireless device is equal to or above the signal threshold, performing a measurement on a second set of a plurality of cells or carriers of a normal measurement group, and
wherein the first set of the one or more cells or carriers of the reduced measurement group is less than the second set of the plurality of cells or carriers of the normal measurement group.

7. The wireless device of claim 6, the processing circuitry further operable to:
obtain the normal measurement group comprising the second set of one or more cells or carriers to be measured.

8. The wireless device of claim 6, the processing circuitry further operable to perform an operational task using a measurement result of at least one of the measurements on the first set of one or more cells or carriers of the reduced measurement group or one of the measurements on the second set of the plurality of cells or carriers of the normal measurement group.

9. The wireless device of claim 8, wherein the operational task comprises performing cell reselection.

10. The wireless device of claim 6, wherein the processing circuitry is operable to determine the wireless device is configured with the DRX cycle longer than a DRX threshold of 20.48 seconds.

11. The wireless device of claim 7, wherein the processing circuitry is operable to obtain the normal measurement group and obtain the reduced measurement group by at least one of receiving a measurement group configuration from a network node, obtaining a pre-defined configuration of the wireless device, or determining autonomously.

12. The wireless device of claim 7, the processing circuitry further operable to:
obtain a normal set of one or more time resources to use for measurement and a normal set of one or more measurements;
obtain a reduced set of one or more time resources to use for measurement and a reduced set of one or more measurements;
perform the measurement on the second set of the plurality of cells or carriers of the normal measurement group by performing at least one measurement of the normal set of one or more measurement types using at least one time resource of the normal set of one or more time resources; and
perform the measurement on the first set of one or more cells or carriers of the reduced measurement group by performing at least one measurement of the reduced set of one or more measurement types using at least one time resource of the reduced set of one or more time resources.

13. The wireless device of claim 6, wherein the signal level of the serving cell at the wireless device includes a receive level (Srxlev) and a quality (Squal), and the signal threshold is 3 dB for at least one of Srxlev and Squal.

14. The wireless device of claim 6, wherein the processing circuitry is operable to perform the measurement on the first set of one or more cells or carriers of the reduced measurement group by measuring common pilot channel (CPICH) Ec/Io and CPICH received signal code power (RSCP) at least two times during a paging transmission window (PTW) cycle in every DRX cycle length.

15. The wireless device of claim 7, wherein the processing circuitry is operable to perform the measurement on the first set of one or more cells or carriers of the reduced measurement group at a first measurement rate and perform the measurement on the second set of the plurality of cells or carriers of the normal measurement group at a second measurement rate, the second measurement rate lower than the first measurement rate.

16. The wireless device of claim 7, wherein the reduced measurement group comprises a set of one or more cells or carriers S1 and the normal measurement group comprises a set of one or more cells or carriers S1+S2.

17. A network node capable of operating in discontinuous activity mode, the network node comprising processing circuitry, the processing circuitry operable to:
- receive, from a wireless device, a measurement result of at least one of:
- a measurement on a first set of one or more cells or carriers comprising a reduced measurement group if a signal level of a serving cell at the wireless device is below a signal threshold; or
- a measurement on a second set of a plurality of cells or carriers comprising a normal measurement group if the signal level of the serving cell at the wireless device is equal to or above the signal threshold; and
- perform an operational task using the received measurement result, and
- wherein the first set of the one or more cells or carriers of the reduced measurement group is less than the second set of the plurality of cells or carriers of the normal measurement group.

18. The network node of claim 17, the processing circuitry further operable to:
- obtain an indication that the wireless device is configured with a discontinuous reception (DRX) cycle longer than a DRX threshold; and
- transmit, to the wireless device, a configuration including at least one of:
- the reduced measurement group, the reduced measurement group comprising the first set of one or more cells or carriers to be measured; and
- the normal measurement group, the normal measurement group comprising the second set of the plurality of cells or carriers to be measured.

19. The network node of claim 17, wherein the processing circuitry is operable to determine the wireless device is configured with the DRX cycle longer than a DRX threshold of 20.48 seconds.

20. The network node of claim 17, wherein the configuration for the reduced measurement group comprises a first measurement rate and the configuration for the normal measurement group comprises a second measurement rate, the second measurement rate higher than the first measurement rate.

21. A wireless device capable of operating in discontinuous activity mode, the wireless device comprising a measuring module and a receiving module:
- the measuring module is operable to determine that the wireless device is configured with a discontinuous reception (DRX) cycle longer than a DRX threshold;
- the receiving module is operable to obtain a reduced measurement group comprising a first set of one or more cells or carriers to be measured;
- the measuring module is further operable to:
- compare a signal level of the serving cell at the wireless device with a signal threshold;
- when the signal level of the serving cell at the wireless device is below the signal threshold, perform a measurement on the set of one or more cells or carriers of the reduced measurement group; and
- when the signal level of the serving cell at the wireless device is equal to or above the signal threshold, perform a measurement on a second set of a plurality of cells or carriers of a normal measurement group, and
- wherein the first set of the one or more cells or carriers of the reduced measurement group is less than the second set of the plurality of cells or carriers of the normal measurement group.

22. A network node capable of operating in discontinuous activity mode, the network node comprising a receiving module and a communication module:
- the receiving module is operable to receive, from a wireless device, a measurement result of at least one of:
- a measurement on a first set of one or more cells or carriers comprising a reduced measurement group if a signal level of a serving cell at the wireless device is below a signal threshold; or
- a measurement on a second set of a plurality of cells or carriers comprising a normal measurement group if the signal level of the serving cell at the wireless device is equal to or above the signal threshold; and
- the communication module is operable to perform an operational task using the received measurement result, and
- wherein the first set of the one or more cells or carriers of the reduced measurement group is less than the second set of the plurality of cells or carriers of the normal measurement group.

* * * * *